(12) United States Patent
Densham et al.

(10) Patent No.: US 9,823,634 B2
(45) Date of Patent: Nov. 21, 2017

(54) SYSTEM AND METHOD FOR PROVIDING THREE-DIMENSIONAL PATHS

(75) Inventors: Gilray Densham, Inglewood (CA); Justin Eichel, Waterloo (CA)

(73) Assignee: CAST Group of Companies Inc., Toronto (CA)

( * ) Notice: Subject to any disclaimer, the term of this patent is extended or adjusted under 35 U.S.C. 154(b) by 369 days.

(21) Appl. No.: 14/396,809

(22) PCT Filed: Apr. 24, 2012

(86) PCT No.: PCT/CA2012/050260
§ 371 (c)(1),
(2), (4) Date: Oct. 24, 2014

(87) PCT Pub. No.: WO2013/159171
PCT Pub. Date: Oct. 31, 2013

(65) Prior Publication Data
US 2015/0120080 A1 Apr. 30, 2015

(51) Int. Cl.
*G05B 15/02* (2006.01)
*A63J 1/00* (2006.01)
(Continued)

(52) U.S. Cl.
CPC .............. *G05B 15/02* (2013.01); *A63J 1/00* (2013.01); *G01S 5/16* (2013.01); *G05D 1/0033* (2013.01); *G06T 17/00* (2013.01)

(58) Field of Classification Search
CPC ... G05B 15/02; A63J 1/00; G01S 5/16; G05D 1/0033; G06T 17/00
See application file for complete search history.

(56) References Cited

U.S. PATENT DOCUMENTS

| | | | | |
|---|---|---|---|---|
| 5,717,848 A | * | 2/1998 | Watanabe | ............... G06T 13/20 345/419 |
| 5,986,675 A | * | 11/1999 | Anderson | ............... G06T 13/20 345/473 |

(Continued)

FOREIGN PATENT DOCUMENTS

| | | |
|---|---|---|
| WO | 2010025559 A1 | 3/2010 |
| WO | 2012027845 A3 | 3/2012 |
| WO | 2012103649 A1 | 8/2012 |

OTHER PUBLICATIONS

Chan, Paul; International Search Report issued in corresponding PCT Application No. PCT/CA2012/050260; search completed Jan. 9, 2013.

*Primary Examiner* — Sean Shechtman
*Assistant Examiner* — Tri T Nguyen
(74) *Attorney, Agent, or Firm* — Blake, Cassels & Graydon LLP; Wilfred P. So

(57) ABSTRACT

A system and method are provided for obtaining a 3D cue path and timing. In one example aspect, this path and timing may be manipulated in software. In another example aspect, one or more conditions may be specified which pertain to the path, timing, state of the path's environment, or state of one or more objects or actors in the path's environment. In another example aspect, these conditions may be accompanied by specifications for one or more actions to be taken if one or more of the conditions are or are not satisfied. In another example aspect, a person or object may be monitored as they follow the path, and prescribed actions may be taken if the specified conditions are or are not found to be satisfied.

28 Claims, 23 Drawing Sheets

(51) Int. Cl.
*G05D 1/00* (2006.01)
*G01S 5/16* (2006.01)
*G06T 17/00* (2006.01)

(56) References Cited

U.S. PATENT DOCUMENTS

| | | | | |
|---|---|---|---|---|
| 6,043,873 | A | * | 3/2000 | Ramer ................ G01S 5/16 356/139.03 |
| 6,095,928 | A | | 8/2000 | Goszyk |
| 6,154,723 | A | * | 11/2000 | Cox .................... G06F 3/011 345/419 |
| 7,099,745 | B2 | | 8/2006 | Ebert |
| 7,711,484 | B2 | | 5/2010 | Hammarlund et al. |
| 8,768,492 | B2 | * | 7/2014 | Fisher .................. A63J 1/028 700/17 |
| 9,299,184 | B2 | * | 3/2016 | Mumbauer ........... G06T 15/20 |
| 2004/0202363 | A1 | * | 10/2004 | Cowperthwaite ....... G01S 1/70 382/154 |
| 2010/0073363 | A1 | * | 3/2010 | Densham ............. G05B 17/02 345/419 |
| 2010/0201787 | A1 | * | 8/2010 | Zehavi ................ G01S 5/16 348/48 |
| 2012/0050535 | A1 | | 3/2012 | Densham et al. |
| 2015/0170403 | A1 | * | 6/2015 | Barcay ............... G06K 9/00476 345/427 |
| 2015/0178972 | A1 | * | 6/2015 | Barcay ................ G06T 17/05 345/419 |

* cited by examiner

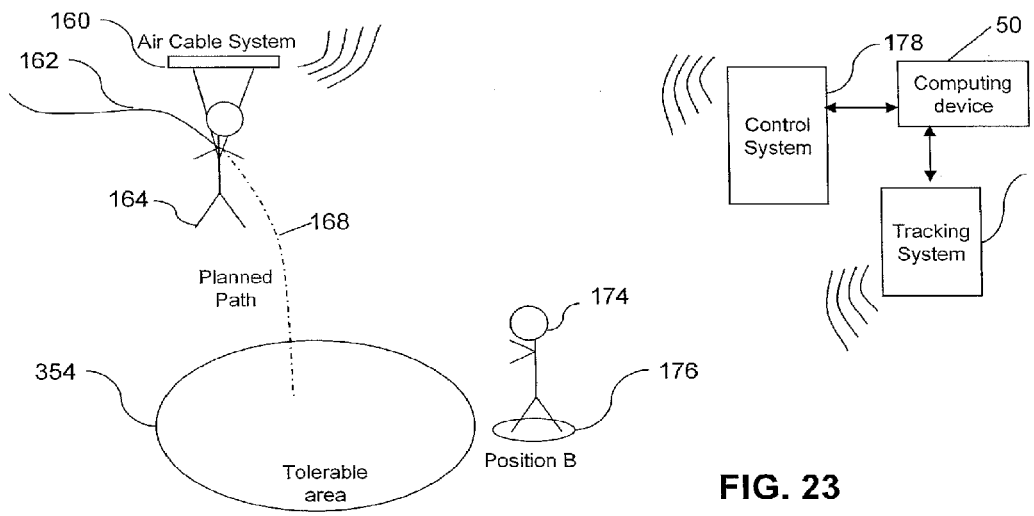
FIG. 23
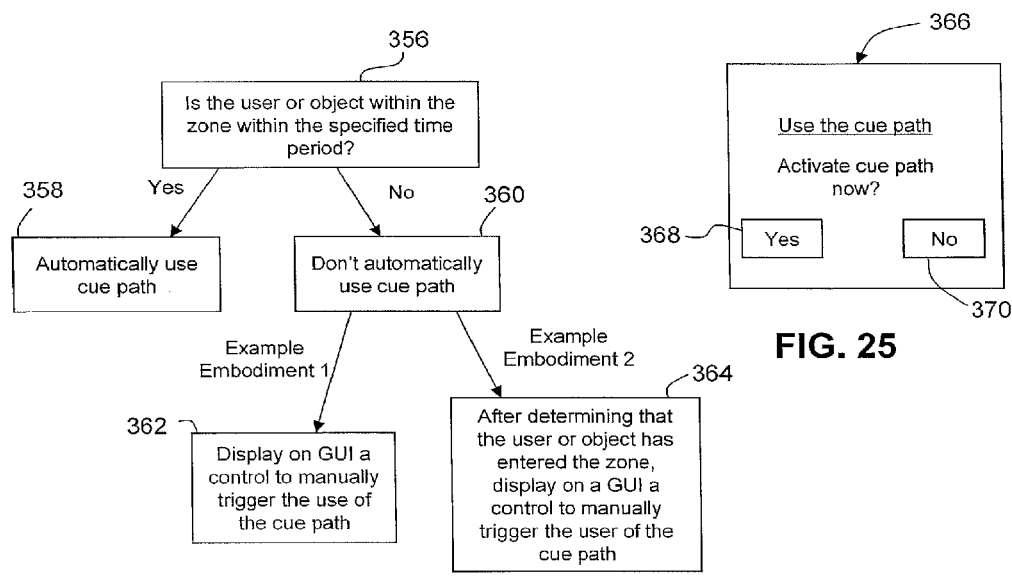
FIG. 24
FIG. 25

SYSTEM AND METHOD FOR PROVIDING THREE-DIMENSIONAL PATHS

TECHNICAL FIELD

The following relates generally to providing three-dimensional (3D) paths.

BACKGROUND

In a theatre, a director or producer plans the paths taken by actors or objects as they perform. The actors or objects then follow the paths. Cues may also be provided to prompt when an actor or an object should follow the path, and to show where the path is located.

Paths are also used in robotics, automation control, and surveillance. Paths can be planned and then followed by a person or an object.

BRIEF DESCRIPTION OF THE DRAWINGS

Embodiments will now be described by way of example only with reference to the appended drawings wherein:

FIG. 23 is an example system for coordinating the activation of the use of a cue path with the location of a person;

FIG. 24 is a flow diagram illustrating example computer executable or processor implemented instructions for automatically activating a cue path if a user or an object is within a zone within a specified time period;

FIG. 25 is an example embodiment of a GUI for manually activating the use of a cue path;

DETAILED DESCRIPTION

Figure 1:
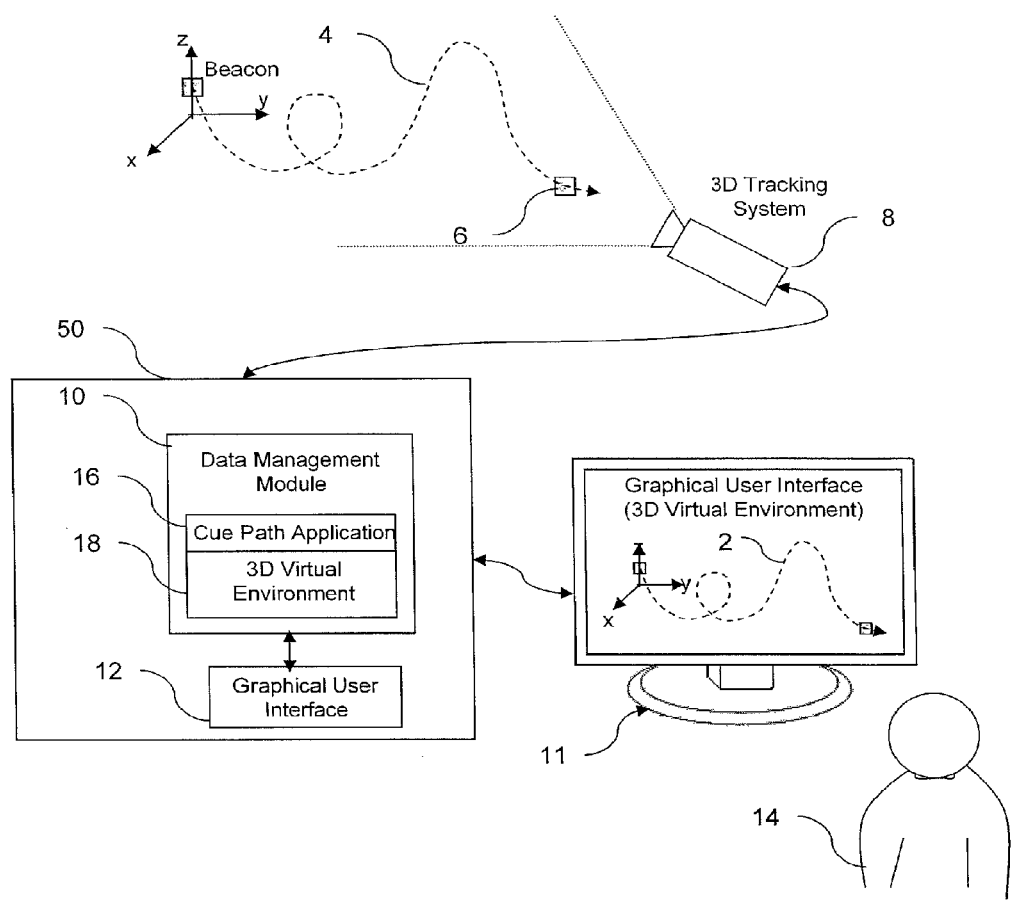
FIG. 1 is an example system for generating a 3D cue path using a tracking system and a beacon.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

By way of example, a director may determine where and when actors should move. The paths along which actors are instructed to move may be called cue paths. Cue paths are three-dimensional. In an example embodiment, each position along the cue path is also associated with orientation information (e.g. roll, pitch, yaw), making the cue path six-dimensional. Although a cue path is able to provide six degrees of freedom (DOF), in some example embodiments, only a subset of the information is used. For example, a cue path may be constrained to two degrees of freedom. Or a cue path could have seven or more degrees of freedom by adding a time element into it and speed, velocity, acceleration, etc.

In an example embodiment, actors may be hoisted by a system of ropes and pulleys and moved along a cue path. Cue paths are not limited to directing actors; they may also specify the movement of scenery elements, props, lighting, sounds, and other stage elements. Some of the example embodiments described herein relate to the entertainment industry. However, cue paths, as described herein, can also be used in robotics, automation, unmanned vehicles, surveillance, manufacturing, material handling, and other industries.

Generating paths and controlling an object to move along the path can be a difficult and time consuming process. For example, generating a path from equations can be time consuming and may not allow the path to be easily modified. Generating a path from equations is also non-intuitive. In another example, a director may attempt to explain a cue path of an object (e.g. a prop, a light, a camera) to a technician, and the technician will attempt to follow the directions to move the object according to the cue path. The technician may not fully understand the director's explanation and, thus, the director's vision or plan for a cue path may not be accurately followed.

In general, cue paths herein refer to a set of coordinates or points that can be used to define a path in space, for example 3D space. There may be cues associated with the cue path that indicate, for example, when an object or person should follow the path, where the path is to begin, what other actions are to be taken along certain positions on the path, and the timing (e.g. speed, velocity, acceleration, etc.) that an object is to use when following the path.

In an example embodiment, a cue path includes multiple segments. Different segments may be associated with different instructions or cues. There may also be general instructions that apply to all segments or multiple segments of a cue path.

In an example embodiment, when an object moves along a cue path, there may be cues/events that are triggered to perform certain actions. For example, when a person moves along a cue path, at a certain position, a cue is triggered to generate the sound of thunder.

Cue paths may specify the timing of when instructions are to be followed. For example, the speed, velocity, or acceleration at which an object is to follow a cue path may be defined and, for example, also monitored and controlled.

In another example embodiment, elements of a cue path may be defined in terms of factors external to the cue path. For example, a first actor is instructed to follow directly behind a second actor, regardless of the movement of the second actor. The first actor's cue path may then be said to be defined in terms of the movements of the second actor. In another example in which a cue path is defined in terms of external factors, an actor is instructed to wait at a location until a door on the set is opened. In this example, the timing of the actor's cue path may be said to be defined in terms of the state of the actor's environment. Similarly, the state of the environment may be defined by an actor's cue path. For example, when an actor approaches a trap door in the set, the trap door may be commanded to close to ensure that the actor does not fall through. In another example embodiment, as the actor approaches a trap door, an alert or warning is generated.

In an example embodiment, cue paths have a tolerance associated with them. For example, an actor is instructed to move along a predefined path with a tolerance of one meter. If, for example, the actor moves along a path that is at all points within half a meter of the predefined path, the actor is considered to be following the predefined path within tolerances. Tolerances are not limited to being spatial in nature. Further examples of tolerances include, but are not limited to: timing; speed; velocity; and acceleration. An instruction may have one or more tolerances associated with it. Different segments of the same cue path may be associated with different tolerances.

In the example of a theatrical environment, or film production environment, many factors may be considered by a director or producer when planning a cue path. The interactions between actors, props, lighting, and other stage elements can be intricate. The interaction may be further complicated when the timing of each action is considered. It is therefore useful to directors to have tools capable of assisting with the planning of cue paths. Such a tool may be a software based 3D model of the stage environment. Such a 3D model may contain representations of the likenesses and positions of stage elements such as actors, scenery, and props. The tool may allow the director to plan cue paths for the stage elements in the 3D model. The tool may have facilities for inputting cue paths. The tool may have facilities for manipulating cue paths. The tool may have facilities for specifying tolerances for the cue paths. The tool may have facilities for specifying actions to be taken should tolerances be violated. The tool may have facilities for monitoring stage elements as they implement their assigned cue paths. The tool may have facilities for assessing whether or not the monitored stage elements have violated a specified tolerance. The tool may have facilities for taking the specified actions in the event that a condition or parameter is met.

As cue paths may be three dimensional in nature, it can be difficult to input cue paths to the 3D model. For example, directors may not be trained to use advanced input devices such as a 3D mouse. The process of generating and planning a cue path can be simplified by providing a more intuitive system for articulating their cue path plans within a 3D model.

FIG. 1 provides an example embodiment of such a system. Referring to FIG. 1, a tracking system 8 is in communication with a computing device 50. The computing device 50 is also in communication with a display device 11. A user 14 can interact with the computing device 50 and display 11. The computing device 50 has a processor, memory, and a communication module for wired or wireless communications, or both.

The tracking system 8 tracks the movement (e.g. position, timing, speed, acceleration, etc.) of a beacon 6 as it traverses a path 4 in physical space. In an example embodiment, the position is tracked using X,Y,Z coordinates. In another example embodiment, the six degrees of freedom (e.g. X, Y, Z position and roll, pitch and yaw angles) are being measured using the tracking system 8.

The data collected by the tracking system 8 is transmitted to the computing device 50 and stored in a data management module 10. The data related to the beacon 6 can be accessed by a cue path application 16, which can also reside on the computing device 50. The computing device 50 may also include a 3D virtual environment 18 which can contain data used to create 3D virtual models. The 3D virtual models can, for example, correspond to physical objects in the physical environment. For example, the 3D virtual environment 18 can be designed or computed to mimic or correspond with a physical environment. The computing device 50 also includes a graphical user interface (GUI) 12 that can interact with cue path application 16 and 3D virtual environment 18, and display data on the display 11. The 3D virtual environment 18 is interchangeably referred to as a 3D virtual world. A non-limiting example of a 3D virtual environment software is commercially available under the name wysiwyg provided by CAST Group of Companies Inc.

The cue path application 16 can, for example, generate a cue path based on the data collected by the tracking system 8. The cue path application 16 can also manipulate and modify a cue path according to predetermined rules or using inputs provided by a user 14 (e.g. through the GUI 12), or both.

In an example embodiment, a cue path can be generated by moving the beacon 6 in a physical space. The path 4 of the beacon 6 is recorded by the tracking system 8, and the path is stored on the computing device 50. A virtual representation of the path 2 may be displayed by the GUI 12 on the display device 11.

For example, the beacon 6 may be positioned at the end of a wand held in the hand of a user (e.g. a director or producer). A user can design or create a cue path by moving the beacon 6 in physical space. A user moves the beacon 6 which creates a path 4. The path 4 of the beacon 6 is tracked using the tracking system 8. The position, orientation and time data of the beacon 6 along the path 4 can be captured and stored in the computing device 50. The data collected in relation to the beacon 6 and its path 4 is used to create the virtual cue path 2. In other words, a user can use the systems and methods described herein to quickly create a 3D cue path of any design by moving the beacon 6 along a path according to the user's desire. Such systems and methods allow a user to intuitively create a six-DOF-information path in three-dimensional physical space.

In an example embodiment, the beacon 6 may include one or more infrared (IR) light emitting diodes (LEDs). The tracking system 8 may include one or more IR cameras to monitor the position the one or more IR LEDs on the beacon 6. It can be appreciated that other types of position tracking systems can be used.

Figure 2:
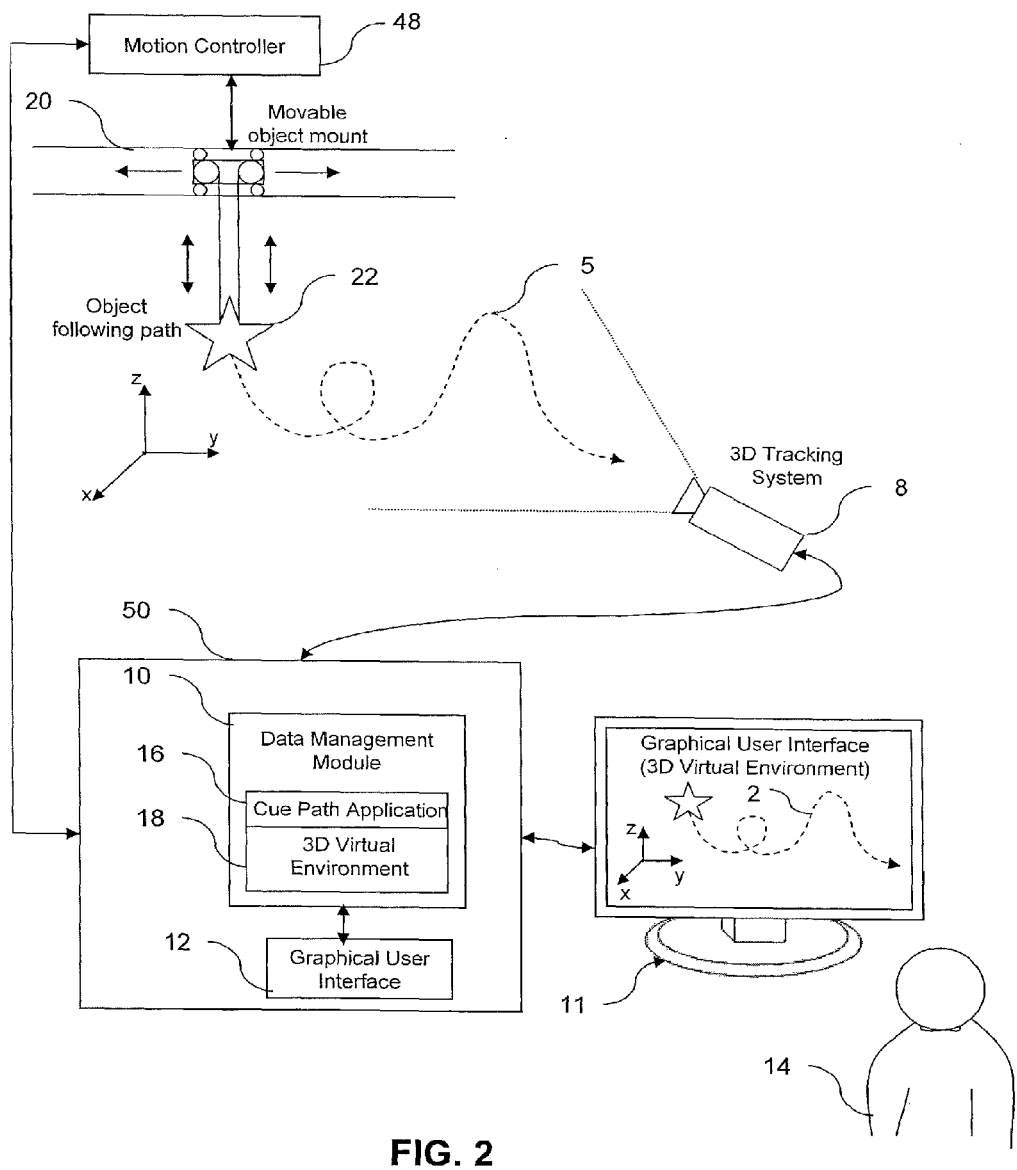
FIG. 2 is an example system for controlling the movement of an object using a 3D cue path.

Turning to FIG. 2, an example configuration for controlling and monitoring the execution of a cue path is provided. In this configuration, the virtual cue path 2 displayed on the display 11 using the GUI 12. The virtual cue path 2 can be generated by tracking a physical path 4, as described with respect to FIG. 1, or it can be generated by other means. This virtual cue path 2 can be stored on the data management module 10.

An actuator 20, such as a carriage running on a track with a pulley system, can be configured to move an object 22. For example, the actuator 20 can move the object 22 is various degrees of freedom, such as in six degrees of freedom. The actuator 20, or a motion controller 48 of the actuator, is in communication with the computing device 50. The actuator 20 can be controlled to move an object 22 to follow the cue path 2. In other words, the actuator 20 moves the object 22 along a physical path 5, and the physical path 5 corresponds to the cue path 2. If the cue path 2 is generated from the physical path 4, as described with respect to FIG. 1, then the physical path 5 of the object 22 is the same (or is similar to) the physical path 4 generated by the beacon 6.

The tracking system 8 is configured to track the motion and timing of the object 22 and store the collected data in data management module 10. This data may be used to compare the physical path 5 with the cue path 2. The comparison of the paths can be used, for example, to determine whether or not the path 5 of the object 22 is within specified tolerances of the cue path 2. The tracking system 8 and the computing device 50 can be used as a feedback controller to modify the cue path 2 that the object 22 is to follow (e.g. provide new control commands to the actuator 20), or to take other action, or both.

Figure 3:
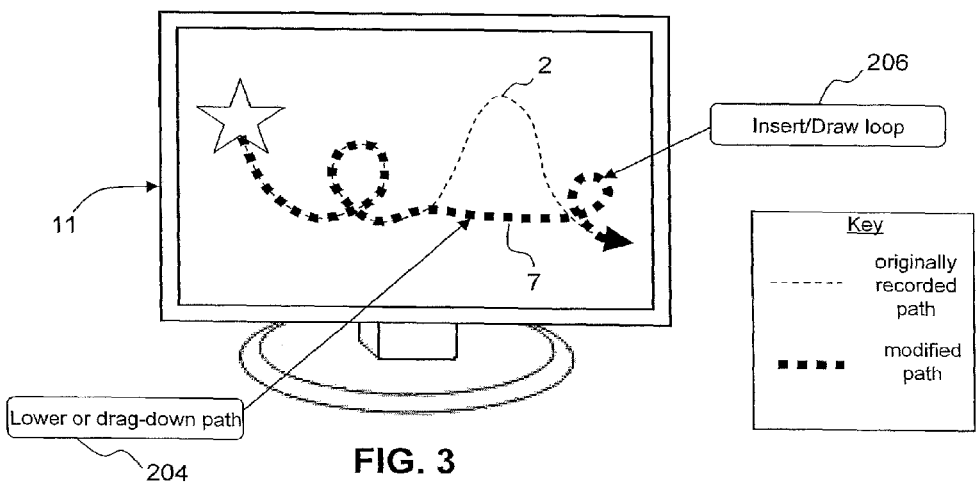
FIG. 3 is an example graphical user interface (GUI) for modifying a 3D cue path.

Turning to FIG. 3, the display device 11 shows the cue path 2 within the 3D virtual world 18. In the example embodiment shown in FIG. 3, the GUI 12 is used to allow a user to modify the path. For example, a user input 204 is received to lower or drag down a segment of the path 2. Another user input 206 is received to insert or draw another loop. The received modifications result in a modified cue path 7, as shown on the display 11. It can be appreciated that the GUI 12 allows for a user to intuitively modify a path.

Figure 4:
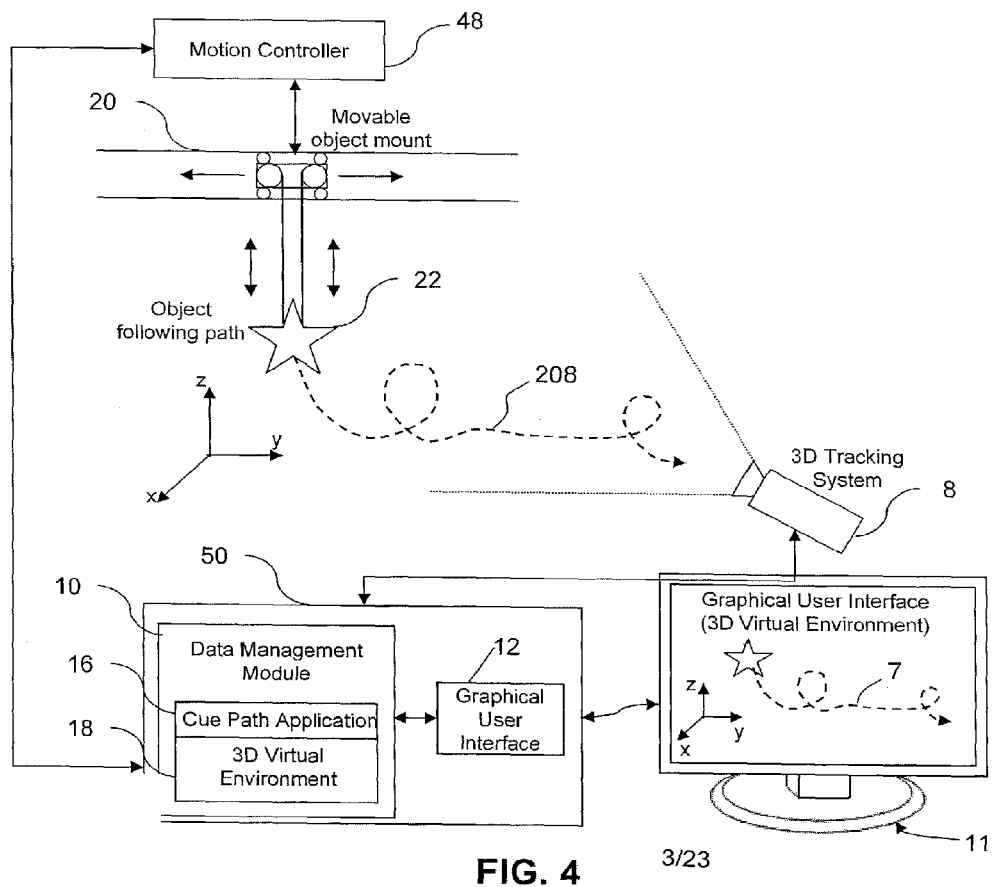
FIG. 4 is an example system for controlling an object using the modified 3D cue path of FIG. 3.

Turning to FIG. 4, the modified cue path 7 can be used to generate control signals to move a real-world object 22. In particular, the modified cue path 7 of the 3D virtual world is used to generate control signals for the motion controller 48, which controls the actuator 20 to move the object 22 to follow a real-world path 208. The real-world path 208 corresponds to the modified cue path 7.

Figure 5:
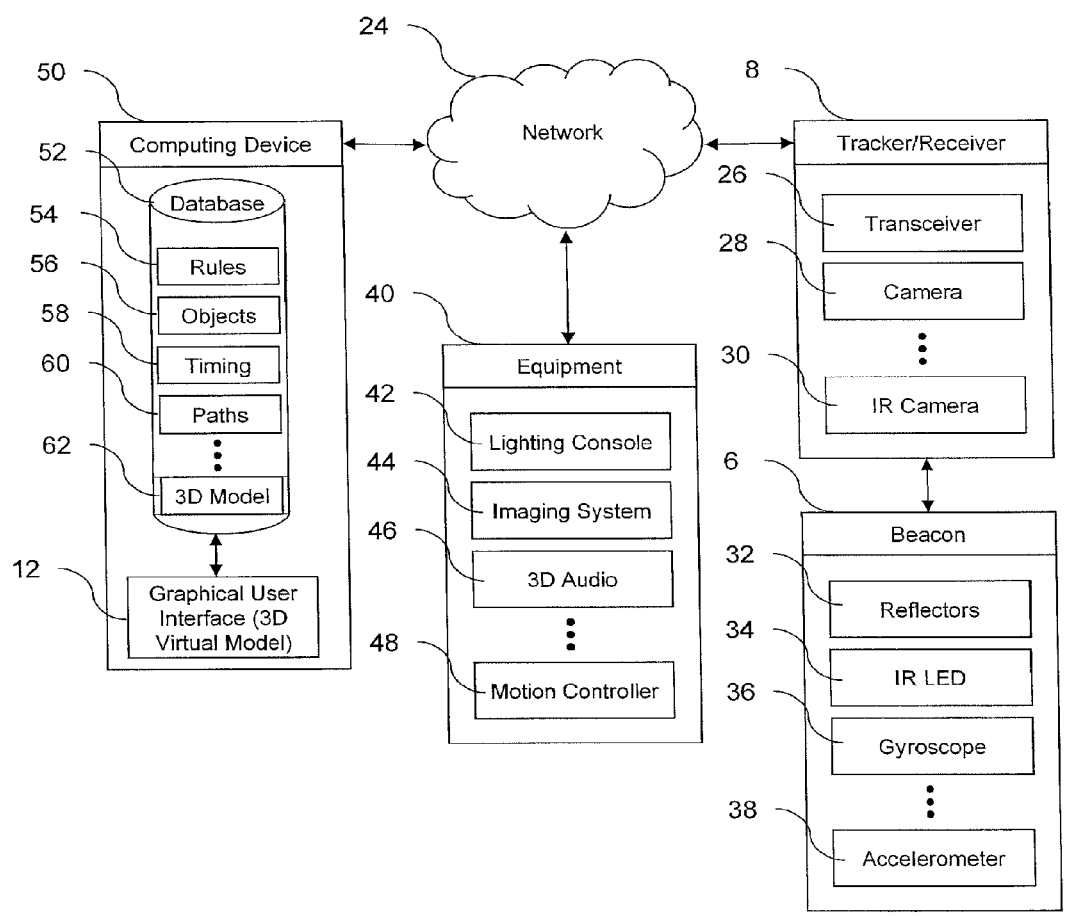
FIG. 5 is a block diagram illustrating example components of a system for generating a 3D cue path and moving an object along the 3D cue path.

Turning now to FIG. 5, an illustration of an example system for generating, controlling and monitoring cue paths is provided. The computing device 50 is in communication with the tracking system 8 over a network 24. The network 24 can be wireless, or wired, or both. Non-limiting examples of wireless communications include WiFi, WiLAN, Bluetooth™, and cellular communications (e.g. Code Division Multiple Access, General Packet Radio Service, EDGE, 3G, 4G, etc.). The beacon 6 is also in communication with the tracking system 8, as the tracking system 8 is at least able to track the movement of the beacon 6. The computing device 50 may also be in communication with other equipment 40, such as other controllers, actuators, sound systems, etc.

Non-limiting examples of various tracking devices and components include a transceiver 26, a camera 28, an IR camera 30, a SONAR device, radio frequency identification (RFID) receivers, a Global Positioning System (GPS) receiver, and a Local Positioning System (LPS) receiver, etc. It can be appreciated that there are various devices and methods that can be used to track an object.

A beacon 6 can be used to facilitate the tracking of an object. Non-limiting examples of a beacon 6 and components thereof include reflectors, 32, IR LEDs 34, a gyroscope 36, an accelerometer 38, and combinations thereof. It can be appreciated that there may be other components that make up a beacon 6. In an example embodiment, the tracking system 8 and the beacon 6 are configured such that the components of the tracking system 8 are well suited to track the beacon 6.

In an example embodiment, the beacon 6 includes an IR LED, gyroscope and accelerometer. The gyroscope measures the angular rotation, and the accelerometer measures the distance travelled. The tracking system receives the data from the accelerometer and the gyroscope. The tracking system also includes two or more IR cameras which can be used to determine the 3D coordinates of the IR light's position. If the IR light's position is occluded, the accelerometer data and the last known position can be used to compute the beacon's new position. An example of such a tracking system and a beacon are commercially available under the trade-mark BlackTrax provided by CAST Group of Companies Inc. An example of a tracking system and a beacon are also described in PCT patent application no. PCT/CA2011/050528, filed on Aug. 30, 2011, and titled "System and Method for Tracking", the contents of which are hereby incorporated by reference.

Continuing with FIG. 5, the computing device 50 may be used to store the data collected by tracking system 8 in a database 52. The database 52 may contain data related to paths which may have been captured by the tracking system 8, or input by the user via the GUI 12. Information about each path 60 can include the position information and the timing information 58 (e.g. start time, end time, speed, velocity, acceleration). The timing information 58 can also include the timing of different actions associated with a cue path, as well as the timing of when different segments of the cue path are activated. The database 52 can also include data related to one or more objects 56, such as representations of their form or their current position and orientation. For example, the objects 56 may be 3D virtual objects, such as CAD models. The database 52 may further contain rules 54. These rules, for example, may be specified by the user through the GUI 12. Examples of such rules 54 include distance tolerances when an object follows a path, timing tolerances, and rotation tolerances. The rules 54 may also include instructions or commands to be implemented when certain conditions or parameters are met, such when a value exceeds a tolerance.

The computing device 50 may also include a 3D model 62 which can represent and combine the data of the rules 54, objects 56, the paths 60 and its timing 58. The 3D virtual model 62 can be considered a type of 3D virtual environment or 3D virtual world, which can be designed to mimic or represent a physical environment. The GUI 12 can be used to allow a user to interact with the 3D virtual model 62. For example, a user can determine which cue paths govern the motion of selected objects within the 3D virtual model 62. In another example, based on the rules 54, the equipment 40 can be activated when an object moves along a cue path.

In an example embodiment, the features and capabilities of the computing device 50 can be incorporated with the features of a real-time environment tracking and command module (RTM), described in PCT patent application no. PCT/CA2009/001225, titled "System and Method for Real-Time Environment Tracking and Coordination", the contents of which are hereby incorporated by reference. An example of such an RTM is commercially available under the trade-mark BlackBox provided by CAST Group of Companies Inc.

The equipment 40 may comprise various components. These components, for example, can be involved with capturing cue paths, enacting cue paths, or controlling other actuators, which in turn execute or interact with cue paths. The equipment 40 can also include components that are affected by cue paths. Example embodiments of such equipment 40 include a lighting console 42, an imaging system 44, a 3D audio system 46 and a motion controller 48.

The lighting console 42 is used to control lighting elements, such as a robotic lights. The lights may be configured to shine upon an object as the object moves along a cue path. The imaging system 44 is used to control cameras or other imaging devices. These cameras may be configured to move such that they have their imaging focused on an object that moves along a cue path. The 3D audio system or device 46 is configured to generate sounds that seem to emanate from a desired location, for example, at particular 3D coordinate. The audio system 46 can, for example, be used to mimic the sound produced by the flight of a bee. In particular, the audio system 46 may be configured to produce sound that appears to emanate along a cue path. For example, if the cue path of a jet airplane is designed to fly above the audience, the 3D audio system 46 could be configured to make it seem as though the sound of a jet engine were emanating from the jet airplane flying above the audience according to the cue path. The motion controller 48 is used for controlling various actuators. For example, a motion controller 48 can be configured to move an object, such that the object follows a cue path.

It will be appreciated that any module or component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the computing device 50, equipment 40, tracking system 8, or beacon 6, or accessible or connectable thereto. Any application or module herein described may be implemented using computer readable/executable or instructions or operations that may be stored or otherwise held by such computer readable media.

Figure 6:
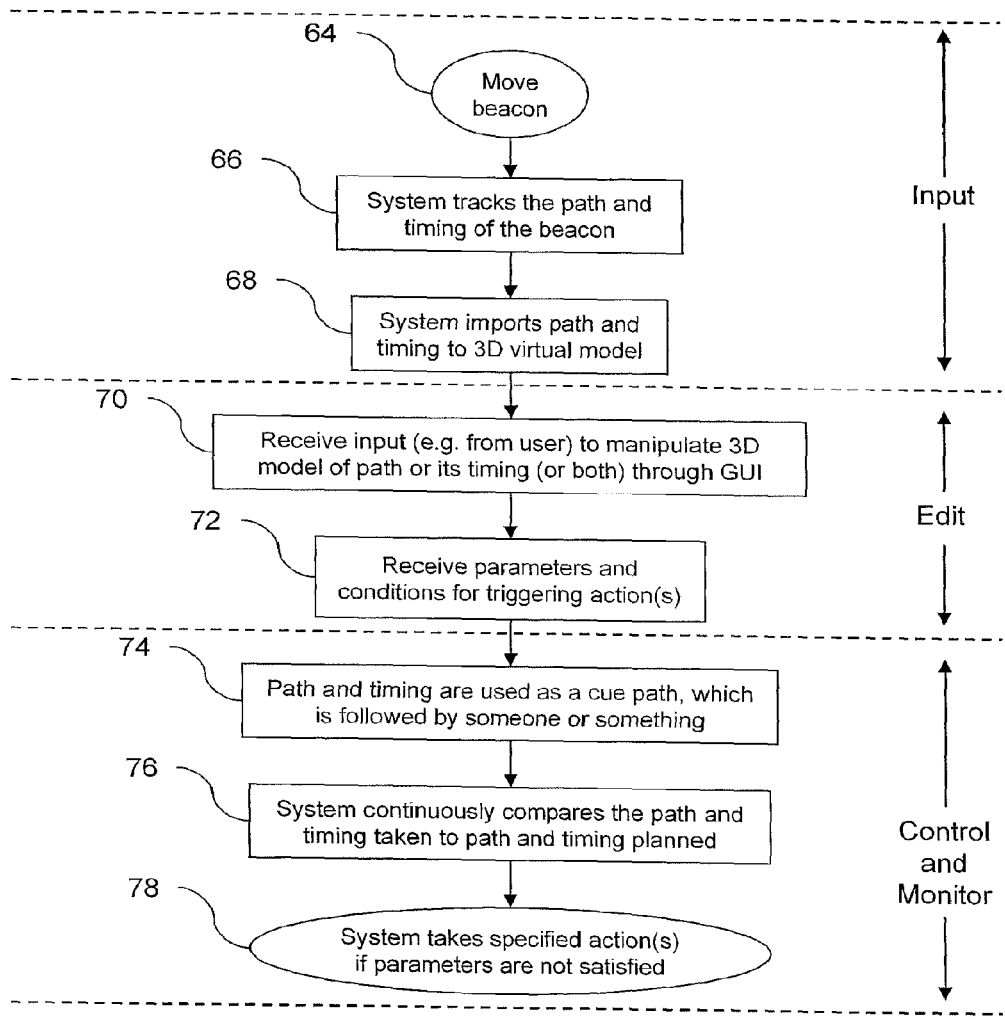
FIG. 6 is a flow diagram illustrating example computer executable or processor implemented instructions for obtaining a path and its timing, manipulating them, monitoring an object as it follows them, and taking action according to certain parameters.

Turning to FIG. 6, example computer executable or processor implemented instructions are provided for obtaining a path and its timing, manipulating them, monitoring an object as it travels the path, and providing control inputs or commands according to certain parameters. The method has three main phases. Blocks 64, 66, and 68 form an input phase where a cue path is generated. Blocks 70 and 72 form an editing phase where the cue path can be modified. Blocks 74, 76, and 78 form a control and monitoring phase where an object can be controlled to follow a cue path. In addition, the path of the object and other circumstances are monitored to determine if the other circumstances may affect the cue path, or if the cue path may affect other circumstances, or both.

At block 64, a beacon 6 is moved and its movement defines a path. At block 66, the system tracks the beacon to obtain data about the path traced by the beacon, for example, using the tracking system 8. The obtained data is inputted into the computing device 50, such as the 3D virtual model 62, to form a cue path.

A cue path can be created using the above process, or can be created directly in software, for example, using user inputs in a GUI 12 or using mathematical equations.

After a cue path is generated, it can be given a unique ID, it can be edited or modified. At block 70 an input is received to manipulate different aspects of the cue path. It can be manipulated through the GUI 12. For example, the cue path is manipulated by scaling, deforming, redefining portions of the path (e.g. by recapturing a path with another input phase, or by specifying new coordinates for the path to pass through), or otherwise editing the path or a segment thereof. The cue path can also be spilt apart into different segments. The timing may be manipulated by scaling, increasing or reducing, or otherwise editing the time, speed, or acceleration with which an object is to follow the cue path. At block 74, one or more parameters, conditions, and tolerances may be added to the path or a segment thereof. Rules or instructions may also be associated with the cue path or its segments, and may also use the parameters, conditions or tolerances. For example, a rule is to stop or deactivate the movement of an object attempting to follow a cue path if the object moves outside a tolerated distance. In an example embodiment, the tolerated distance is used to define the boundaries of a volume of space within which the object is allowed to move within. Another example embodiment rule is that if another object comes within a predetermined volume of space, then the object following the cue path is stopped.

At block 74, an object is commanded to follow a cue path. The object can be controlled to follow the cue path, or the object (e.g. a person) may be made aware of the cue path and attempt to follow it. At block 76, the system compares the object's path and its timing to determine if it matches the parameters of the cue path. The surrounding circumstances of the object may also be monitored. At block 78, if certain rules are activated (e.g. tolerances are not satisfied, certain conditions are met, etc.), then the system performs the related actions or transmits the related commands. In another example, if a vehicle is directed to move along its cue path at no greater than 10 km/h, the system may act to reduce the vehicle's speed if it detects that it is greater than 10 km/h.

Figure 7:
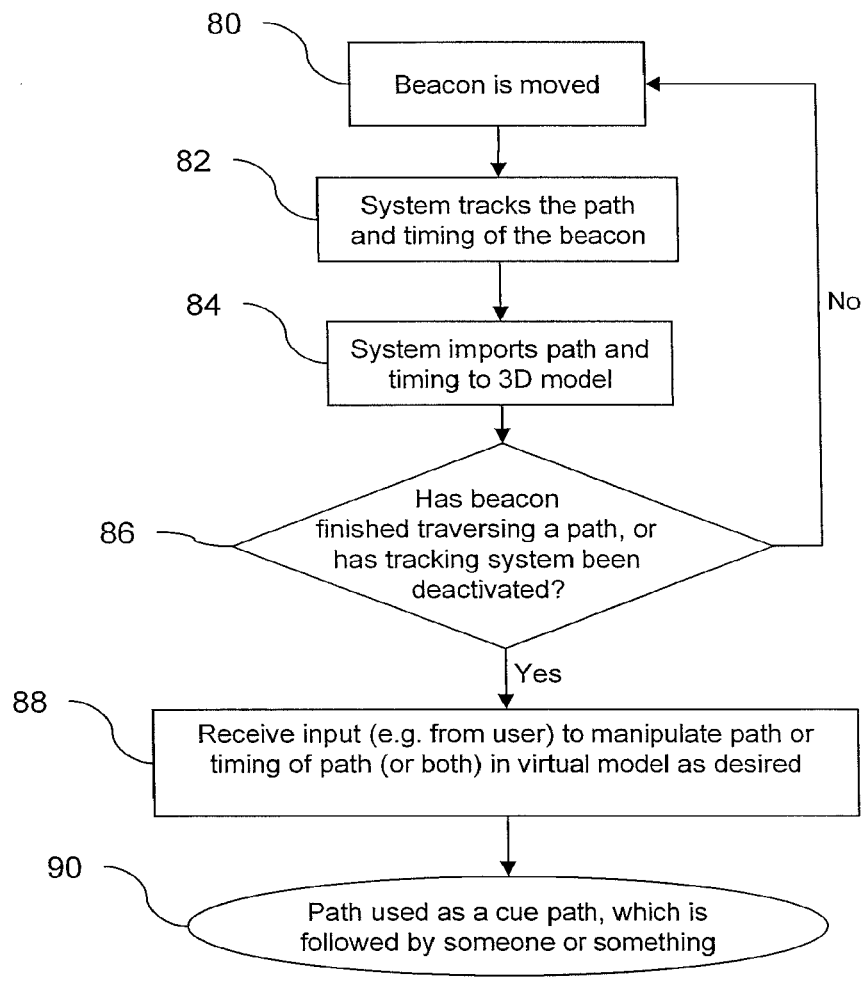
FIG. 7 is a flow diagram illustrating example computer executable or processor implemented instructions for obtaining a path and its timing and manipulating them.

Turning now to FIG. 7, example computer executable or processor implemented instructions are provided for inputting a cue path. At block 80, a beacon 6 is moved. For example, it can be initially positioned at a starting position along a desired path and then its tracking capabilities are activated. At block 82, the tracking system 8 tracks the path and timing of the beacon. The system may track other data about the path or the beacon, such as orientation. At block 84, the path data is imported into a 3D model. At block 86, the beacon is tracked until it is indicated that the beacon has completed traversing its path (e.g. the beacon is deactivated, a timer elapses, etc.), or the tracking system 8 is deactivated. For example, if the beacon continues to move, and the tracking system has not been deactivated, then the process continues to block 80. Otherwise, the process continues to block 88.

At block 88, the captured data of the cue path is manipulated, if desired. In particular, the computing device 50 receives user inputs to manipulate or modify the path or the timing of the path in the 3D virtual environment. As shown in block 90, the captured data is used as a cue path for an object to follow.

Figure 8:
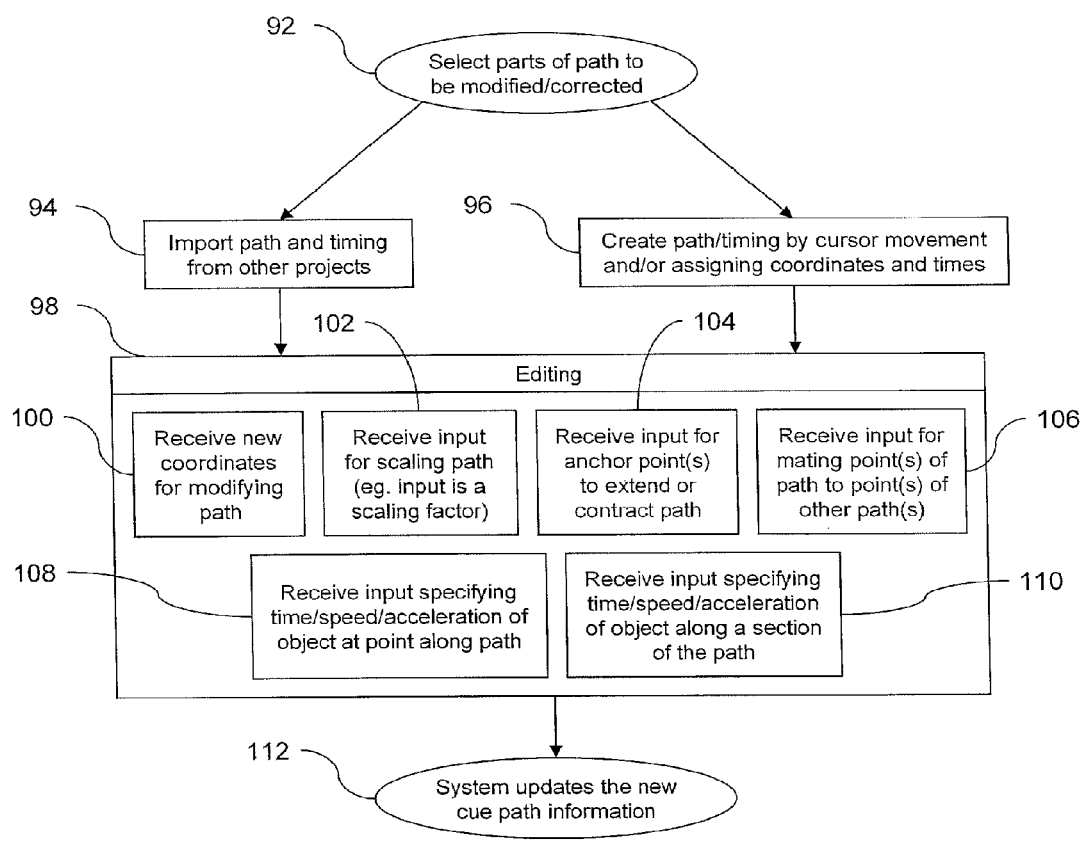
FIG. 8 is a flow diagram illustrating example computer executable or processor implemented instructions for modifying a cue path, its timing, or both.

Turning to FIG. 8, an example method for modifying or editing a cue path is provided. At block 92 a cue path, or one or more segments of the cue path, are selected. The selected cue path or segments will be modified. These cue paths may be obtained by either importing them from the database 52 (block 94), or by creating them via a GUI 12 (block 96). The cue path is edited at block 98. The cue path may be edited in various ways. Non-limiting examples are provided. The cue path is modified by adding or replacing new position coordinates (block 100). For example, the coordinates of a specified data point on the cue path are replaced with different coordinates. The cue path can be scaled up or down (block 102). For example, a scaling factor is applied that doubles the values of all x-coordinates in the path, effectively stretching the path along the direction of the x-axis. The cue path can also be constrained by newly defined anchor points (block 104). This can extend the path in a certain direction, or contract the path in a certain direction. The cue path can be modified by combining or joining one or more points from the cue path to one or more other points of another path (block 106). For example, at time=50 seconds, the cue paths for two different objects may be specified to intersect. In another example embodiment, two or more cue paths can be combined to form a single cue path. The cue path can also be modified by according to the time, speed, acceleration, or combinations thereof, of an object mobbing along the cue path (block 108). Similarly, at block 110, the time, speed, or acceleration of an object moving along a segment of the cue path can be modified. For example, the object can be commanded to slow down, speed up arrive at a point at an earlier time, etc.

At block 112, the modified cue path is updated and stored in the computing device 50.

Figure 9:
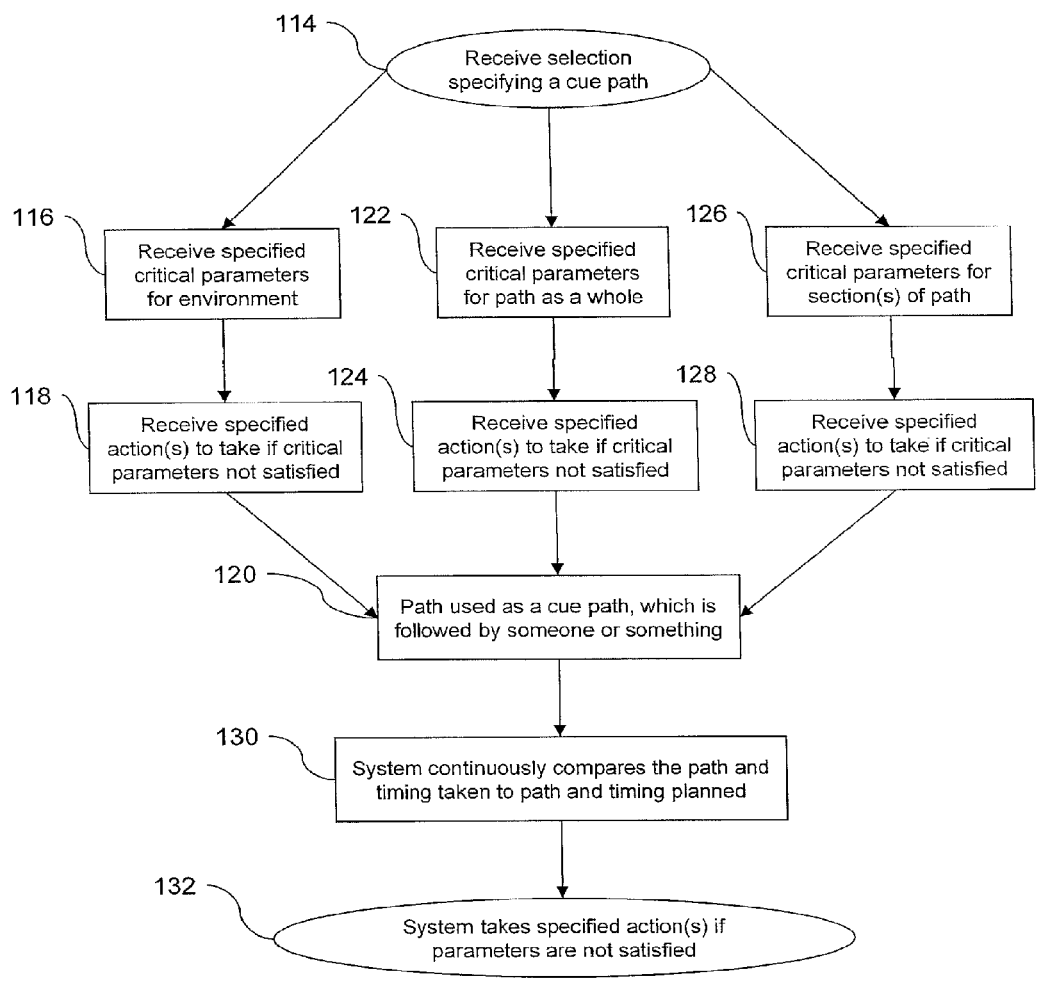
FIG. 9 is a flow diagram illustrating example computer executable or processor implemented instructions for specifying actions to take in relation to a cue path according to certain parameters, and taking action according to the certain parameters.

Turning to FIG. 9, example computer executable or processor implemented instructions are provided for constraining a cue path. At block 114, a selection is received which specifies a cue path to be constrained. At blocks 116, 122, and 126, constraints for the environment, a path, or a segment of a path, respectively, are received. At blocks 118, 124, and 128, the computing device 50 receives the actions to be taken in the cases where the constraints for the environment, path, or sections of the path, respectively, are not met. In another example, if certain parameters are satisfied, then certain actions can be performed. At block 120, an object or person follows the defined cue path. At block 130, the computing device 50, through the tracking system 8, monitors the object to determine if it is following the cue path, and how closely it is following the cue path. Other parameters, such as the timing of the object along the cue path, may also be monitored. At block 132, if it is determined that one of the constraints from blocks 116, 122, and 126 are violated, then the corresponding action is invoked according to those provided in block 118, 124, and 128, respectively.

For example, a user may specify that a gate door is to be lowered five seconds after an actor walks through a gate threshold (e.g. an environmental constraint), and that the actor is to run through the gate threshold (e.g. constraint for a segment of the path). However, if it is detected through the monitoring process that actor is moving more slowly than expected (e.g. walking instead of running) through the gate, then the gate door may be instructed to lower at a later time (e.g. at 15 second delay, rather than a 5 second delay) to ensure that the actor has enough time to move through the gateway.

Figure 10:
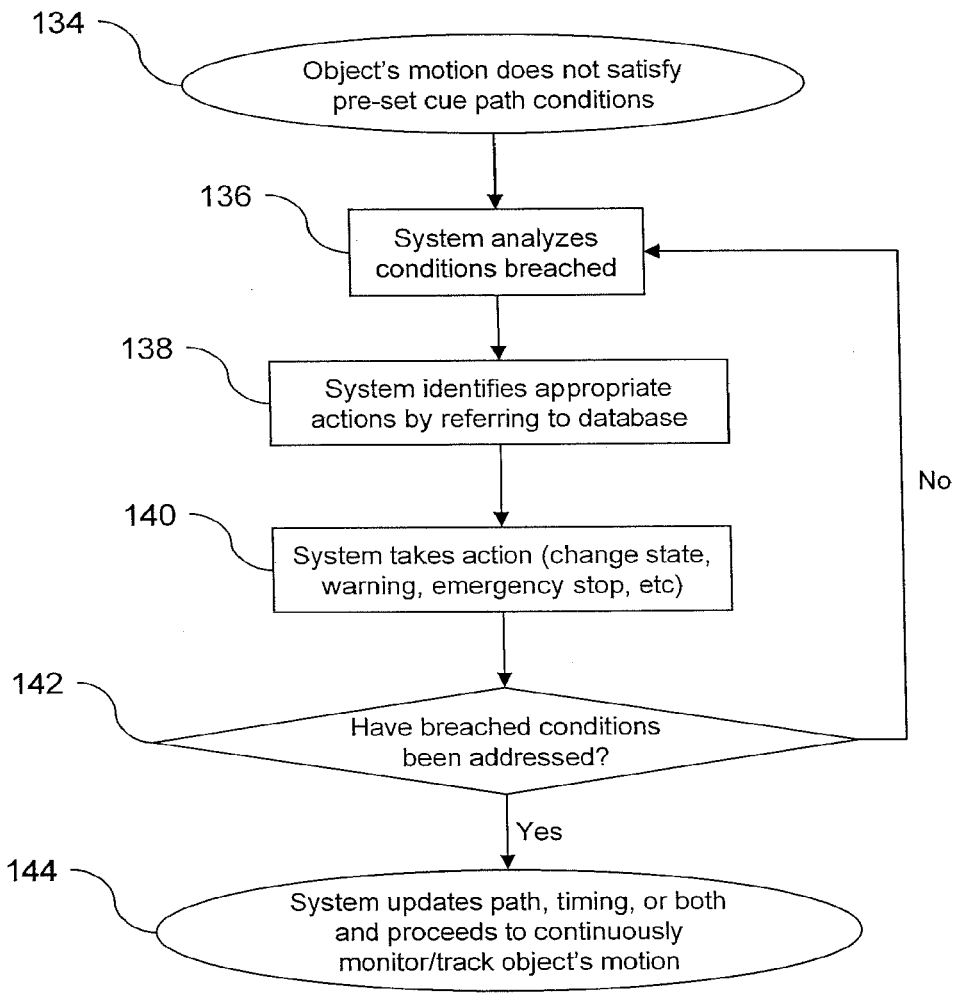
FIG. 10 is a flow diagram illustrating example computer executable instructions for taking prescribed actions when specified conditions are or are not satisfied.

Turning now to FIG. 10, an example method for providing instructions in response to a breached constraint is provided. At block 134, the computing device 50 detects that an object, that is supposed to be following a cue path, is not meeting one or more constraints. At block 136, the rules associated with the triggered conditions or parameters are analyzed. At block 138, the actions associated with the rules are identified, for example, by searching the database 52. At block 140, the computing device 50 performs a certain identified action or issues a command to perform the certain identified action. Non-limiting examples of such actions include changing the state of the object, issuing a warning, and issuing an emergency stop to control systems and actuators affected by the object or interacting with the object.

At block 142, the computing device 50 determines if the conditions have been addressed. If they are not (e.g. certain conditions are still not met), the method may be repeated from block 136. For example, if a wirelessly controlled helicopter is determined to be moving too fast along its cue path, the computing device 50 may issue a command to slow down the helicopter. The computing device 50 would then check whether or not the helicopter had been sufficiently slowed. If the helicopter was not sufficiently slowed, then the computing device 50 may issue commands to further slow or even stop the helicopter.

At block 144, the computing device 50 stores the updates or modifications made to the cue path of the object. It may then continue to issue commands for the object to follow the modified cue path.

Figure 11:
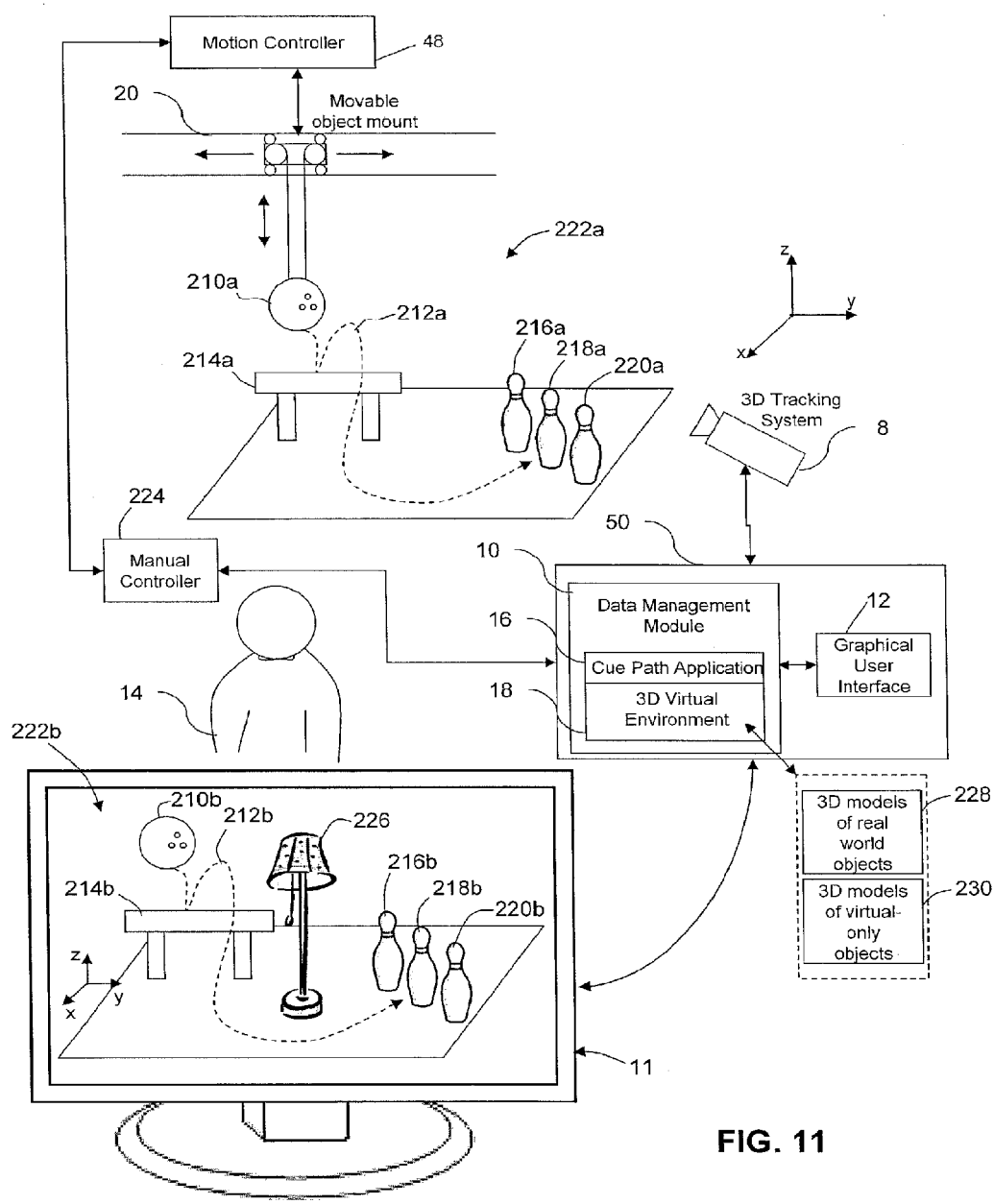
FIG. 11 is an example system for creating and recording a cue path using a manual controller.

Turning to FIG. 11, an example embodiment of a scenario is provided. A physical environment 222a is shown. The suffix 'a' is used in the reference numerals to indicate elements of the real or physical world, and the suffix 'b' is used to indicate elements of the virtual environment or virtual world. The physical environment 222a includes a table 214a, and bowling pins 216a, 218a, 220a. A user 14 desires to control the movement and path of a bowling ball 210a (e.g. or more generally, an object) to move along a physical path 212a. The user 14 can provide user inputs to a manual controller 224 to provide control signals to the motion controller 48 to move the ball 210a (via an actuator 20). Non-limiting examples of manual controllers include haptic feedback controllers, a joystick, a handheld controller, a keyboard, a mouse, a trackball, a touch screen, and combinations thereof.

Continuing with FIG. 11, a 3D virtual world 18 is created to generally correspond with the physical world. In particular, the virtual environment 222b corresponds with the physical environment 222a. Virtual 3D models of the bowling ball 210b, the table 214b, and the bowling pins 216b, 218b, 220b are included in the virtual environment 222b, which correspond with and represent the physical objects in the physical environment 222a. It can be appreciated that the dimensions and positioning of the virtual objects correspond with the dimensions and positioning of the real world objects. The virtual environment 222b also includes a virtual floor lamp 226 (or more generally a virtual object) which does not correspond with or represent an object in the physical environment 222a. The virtual floor lamp 226 is a computer generated image. This example scenario can be used in movie or television production where computer generated images or objects are placed into a scene along with real world objects.

In an example embodiment, a 3D virtual environment 18 includes 3D models of real world objects 228 (e.g. that correspond to real world objects) and includes 3D models of virtual-only objects 230.

The user 14 desires to move the physical bowling ball 210a and the virtual bowling ball 210b so that neither is obstructed by either the real table 214a or virtual table 214b, and that the virtual bowling ball 210b is not obstructed by the virtual lamp 226.

The user's input into the manual controller 224 controls the movement and path of the physical bowling ball 210a and of the virtual bowling ball 210b. The manual controller 224 is also in communication with the computing device 50, which processes the control signal inputs from the controller 224 to move the bowling ball 210b in the virtual environment 222b. Therefore, the physical path 212a of the bowling ball 210a corresponds with the virtual path 212b of the bowling ball 210b.

Continuing with FIG. 11, the user 14 looks at the display 11 to view the virtual environment 222b and provides inputs to the manual controller 224 to move the virtual bowling ball 210b to bounce on the table 214b, move around the lamp 226, and to hit the bowling pins 216b, 218b, 220b. This results in the path 212b. Concurrently, the same user inputs are used to move the physical ball 210a in a similar movement, resulting in a physical path 212a. The physical movement of the ball 210a provides a strong visual feedback to the user about how the ball 210a moves in the physical environment 222a. Such visual feedback can be in addition to the visual feedback provided by the display 11. It can be appreciated that this system allows a user to intuitively create a cue path.

Figure 12:
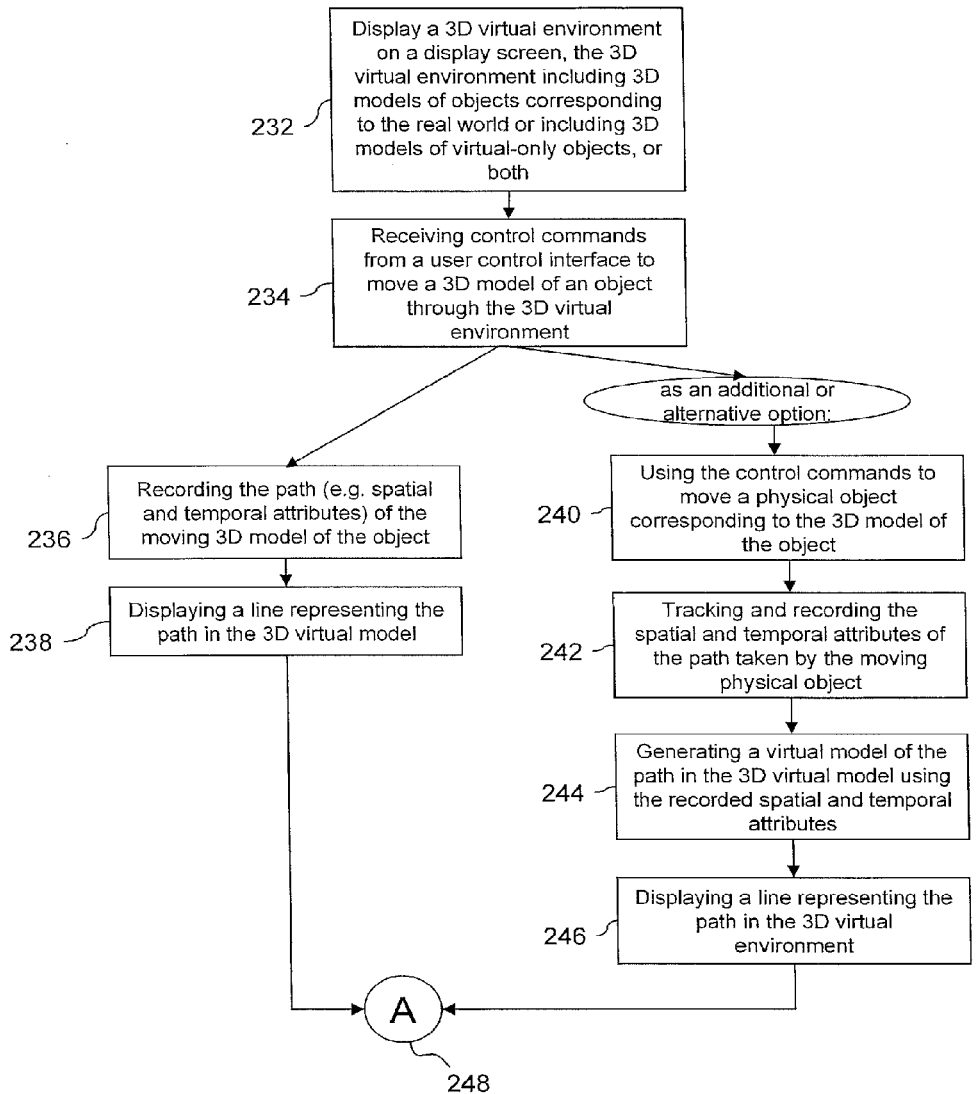
FIG. 12 is a flow diagram illustrating example computer executable or processor implemented instructions for creating and recording a cue path using control commands received from a manual controller.

Turning to FIG. 12, example computer executable or processor implemented instructions are provided for generating a cue path. The instructions, for example, correspond to the example configuration described in FIG. 11. At block 232, the computing device 50 displays a 3D virtual environment on a display screen 11. The 3D virtual environment includes 3D models of objects corresponding to the real world, or includes 3D models of virtual-only objects, or both. At block 234, the computing device receives control commands from a user control interface to move a 3D model of an object through the 3D virtual environment.

At block 236, the computing device records a path of the moving 3D model of the object. In particular, the spatial and temporal attributes of the path are recorded. At block 238, the computing device displays a line representing the path in the 3D virtual model.

As an alternative or as an additional example embodiment to blocks 236, 238, the operations of blocks 240, 242, 244, 246 can be executed or implemented. At block 240, the user's control commands are sent to an actuator to move a physical object corresponding to the 3D model of the object. At block 242, the spatial and temporal attributes of the path are tracked or measured using a tracking system. For example, there may be a beacon 6 located on the physical object that allows it to be tracked. The spatial and temporal attributes of the path are recorded on the computing device 50. At block 244, the computing device generates a virtual model of the path in the 3D virtual environment using the recorded spatial and temporal attributes. At block 246, the computing device displays a line representing the path in the 3D virtual environment.

In an example embodiment, the processes described with respect to FIG. 12 can be used by a director or a technician to create cue path to interact with a physical environment or a virtual environment, or both. After the cue path is created, in some situations, the physical environment or the virtual environment, or both, are modified. For example, objects may be added, removed, or repositioned. Such a situation is typical when designing a movie or film set, for example. These changes to the environment may affect the cue path. For example, as a result of the modifications, an object is now positioned to obstruct the cue path. Therefore, it may be desirable to update or modify the cue path.

Figure 13:
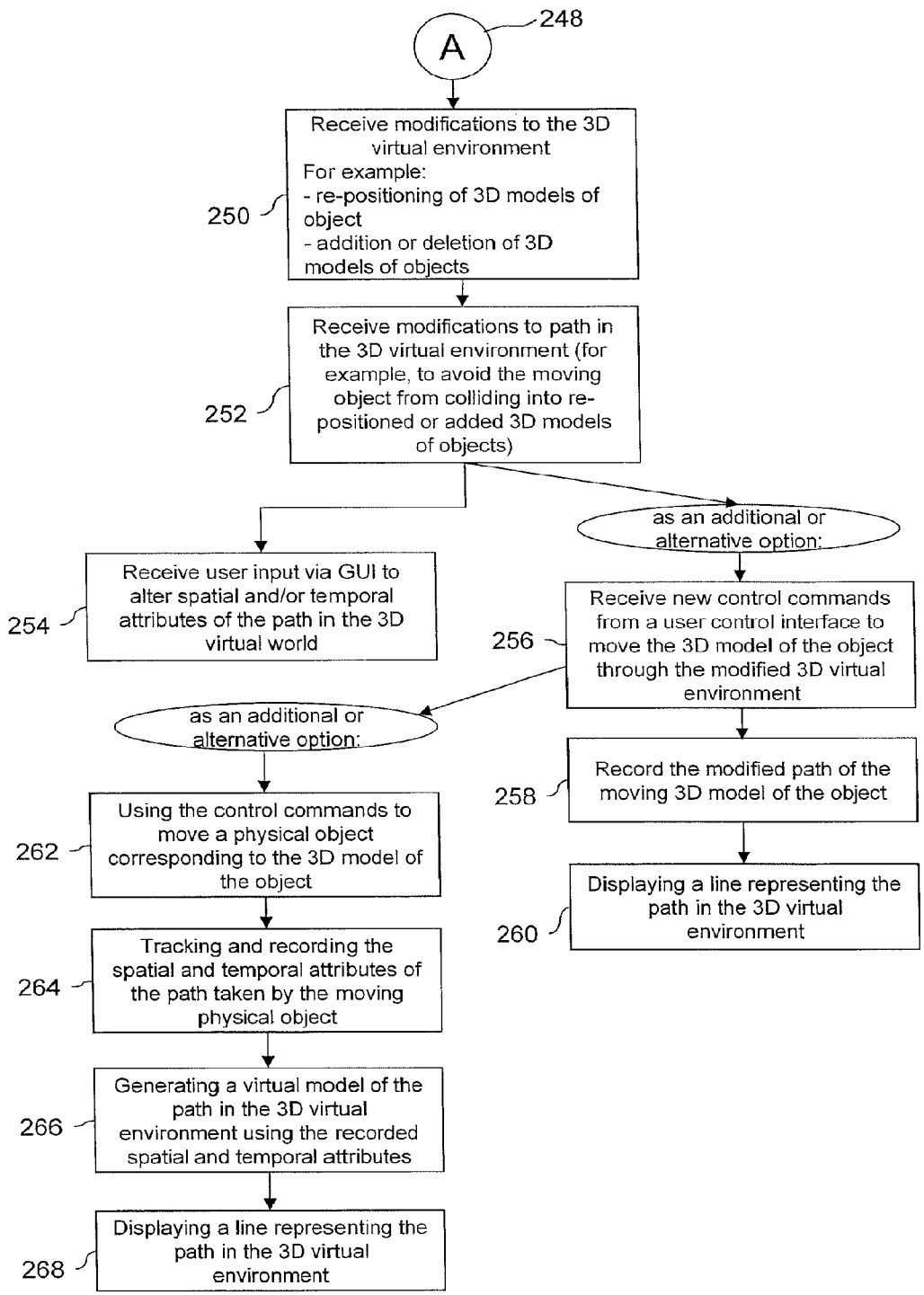
FIG. 13 is a flow diagram illustrating example computer executable or processor implemented instructions for modifying a cue path.

Continuing from circle 'A' 248 shown in FIG. 12, after the cue path has been created, a further process is provided to modify the cue path in FIG. 13.

Turning to FIG. 13, example computer executable and processor implemented instructions are provided for modifying a cue path. At block 250, the computing device 50 receives modifications to the 3D virtual world. The modifications include, for example, repositioning, adding, or deleting a 3D model of an object. At block 252, the computing device 50 receives modification to the cue path in the 3D virtual environment. For example, the modifications involve changing the path to avoid colliding into an object.

In an example embodiment, the modifications are made through the GUI 12. At block 254, the computing device 50 receives one or more user inputs through the GUI 12 to alter spatial attributes or temporal attributes, or both, of the path in the 3D virtual environment.

In another example embodiment, the modifications are made by a user creating a new 3D cue path, or creating new segments of a 3D cue path. For example, as an alternative or as an additional example embodiment, new control commands from a user control interface 224 are received to move the 3D model of the object through the modified 3D virtual environment (block 256). The modified path of the moving 3D model of the object is recorded in the 3D virtual world using the computing device 50 (block 258). At block 260, a line is displayed representing the path in the 3D virtual environment.

As an alternative example embodiment to blocks 258, 260, or as an additional example embodiment to block 258, 260, the modified path can be recorded by tracking the physical movements of the physical object (blocks 262, 264, 266, 268). Continuing from block 256 and referring to block 262, the computing device 50 uses or transmits the control commands to move a physical object corresponding to the 3D model of the object. At block 264, the tracking system 8 tracks and records the spatial and temporal attributes of the path taken by the moving physical object. The recorded spatial and temporal attributes are received by the computing device 50 and, at block 266, the computing device 50 generates a virtual model of the path in the 3D virtual environment. At block 268, the computing device 50 displays a line representing the path in the 3D virtual environment.

In view of the above, it can be appreciated that a user can conveniently and intuitively revise or modify a cue path to adapt to modifications made to the 3D virtual environment.

Figure 14:
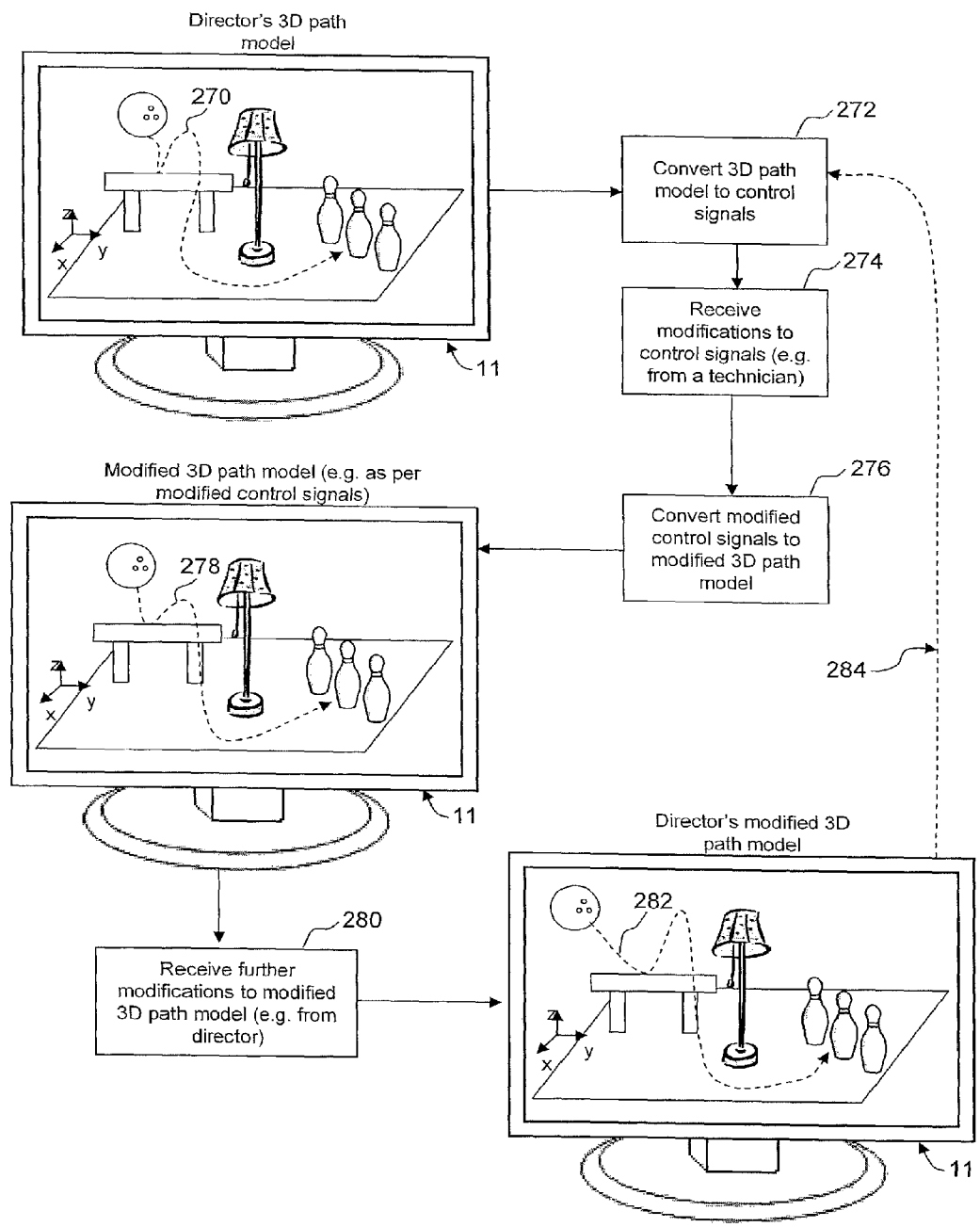
FIG. 14 is a flow diagram illustrating example computer executable or processor implemented instructions for converting a cue path to control signals, modifying the control signals and the cue path, and displaying various versions of the modified cue path.

Turning to FIG. 14, a combination of example embodiment screenshots and example computer executable or processor implemented instructions are provided for modifying a cue path. Initially, a 3D model of a path 270 is shown on the display 11. The path 270 is created, for example, by a director. At block 272, the path 270 is converted into control signals. Currently known and future known algorithms for deriving control signals based on a series of three-dimensional coordinates (e.g. which form the path), can be used. At block 274, modifications to the control signals are received. For example, a technician may modify the control signals for various reasons. In an example scenario, the path 270 is not technically practical or feasible to implement, and thus a technician modifies the control signals to implement the path. The modified control signals are converted to a modified 3D model of a path (block 276). Currently known and future known algorithms for deriving a series of three-dimensional coordinates (e.g. to generate the path) from control signals can be used. The modified path 278 is shown on the display 11. The director can view the modified path 278 and make further modifications, if desired. For example, at block 280, the computing device 50, via the GUI 12, receives further modifications to the modified 3D path model. The further modified path 282 is shown in the display 11. Optionally, the process can repeat by converting the further modified path 282 to control signals, as indicated by the dotted line 284. In other words, blocks 272, 274, 276, and 280 can be repeated.

Figure 15:
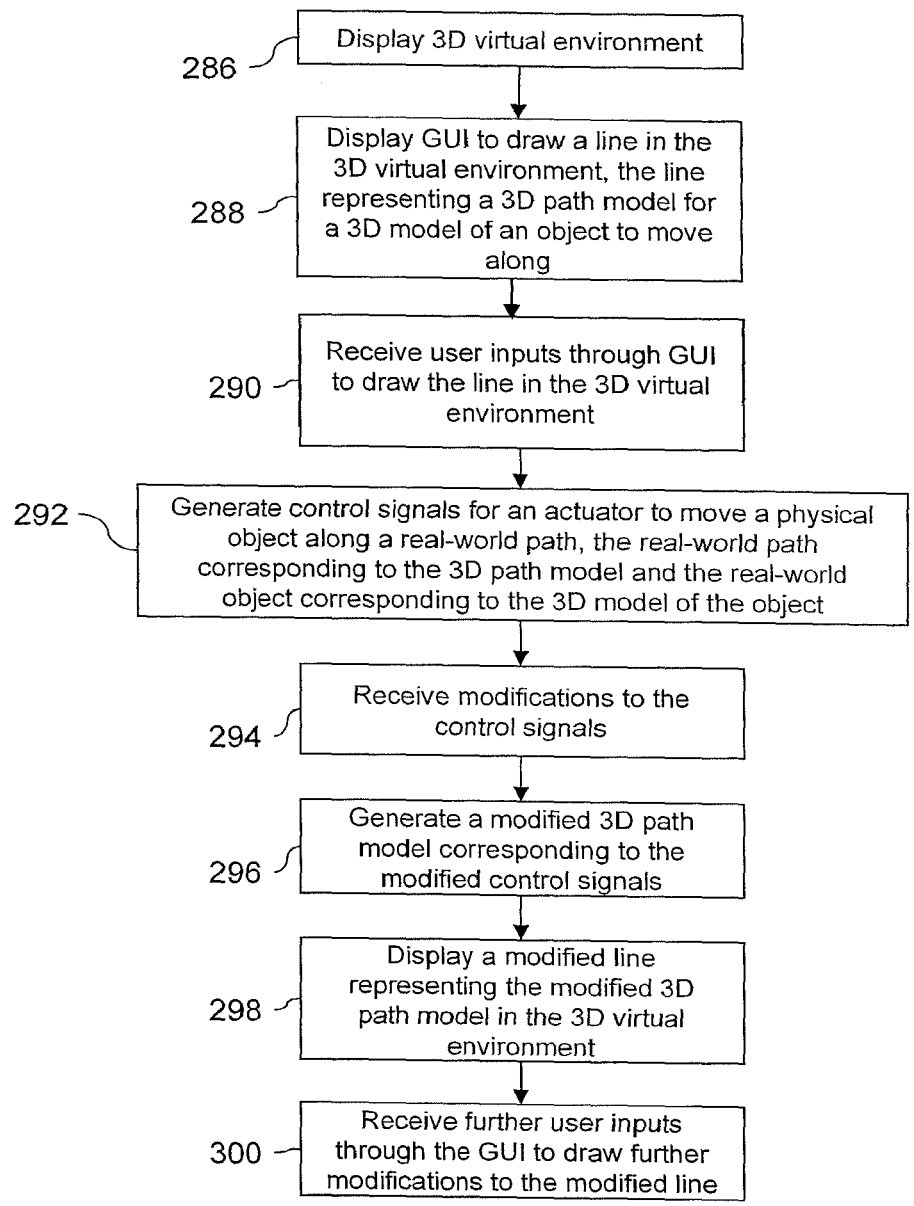
FIG. 15 is a flow diagram illustrating example computer executable or processor implemented instructions for modifying a cue path using a GUI and through control signals.

Turning to FIG. 15, an example embodiment of computer executable or processor implemented instructions are provided for modifying a cue path based on changes to control signals. At block 286, the computing device 50 displays a 3D virtual environment on the display 11. At block 288, a GUI 12 is displayed to draw a line in the 3D virtual environment. The line represents a 3D model of a path for a 3D model of an object to move along. At block 290, user inputs are received through the GUI to draw the line in the 3D virtual environment. At block 292, control signals are generated for an actuator to move a physical object along a real-world path. It can be appreciated that the real-world path corresponds to the 3D model of the path and the real-world object corresponds to the 3D model of the object.

At block 294, modifications are received to the control signals. At block 296, the computing device 50 generates a modified 3D path model corresponding to the modified control signals. At block 298, the computing device 50 displays a modified line representing the modified 3D model of the path in the 3D virtual environment. At block 300, the computing device 50 receives further inputs through the GUI 12 to draw further modifications to the modified line.

In an example embodiment, a user can move a beacon 6 to define a path of an object, such as a moveable camera (e.g. flying camera, robotic camera, etc.). The user may move the beacon to define a small-sized path within a miniature model of a theatre or movie set. In this way, the camera positioning and timing within the theatre or movie set can be defined. The small-sized cue path can then be scaled in size to match the actual dimensions of the actual theatre or movie set. In other words, a larger-sized cue path is computed from the small-sized cue path. The moveable camera is then controlled to follow the larger-sized cue path. Such a process makes it easy for a director or producer, or another user, to accurately define a cue path and have an object accurately follow the cue path, or variations of the same. Details about how a cue path can be modified are provided with respect to an example embodiment described in FIG. 16.

Figure 16:
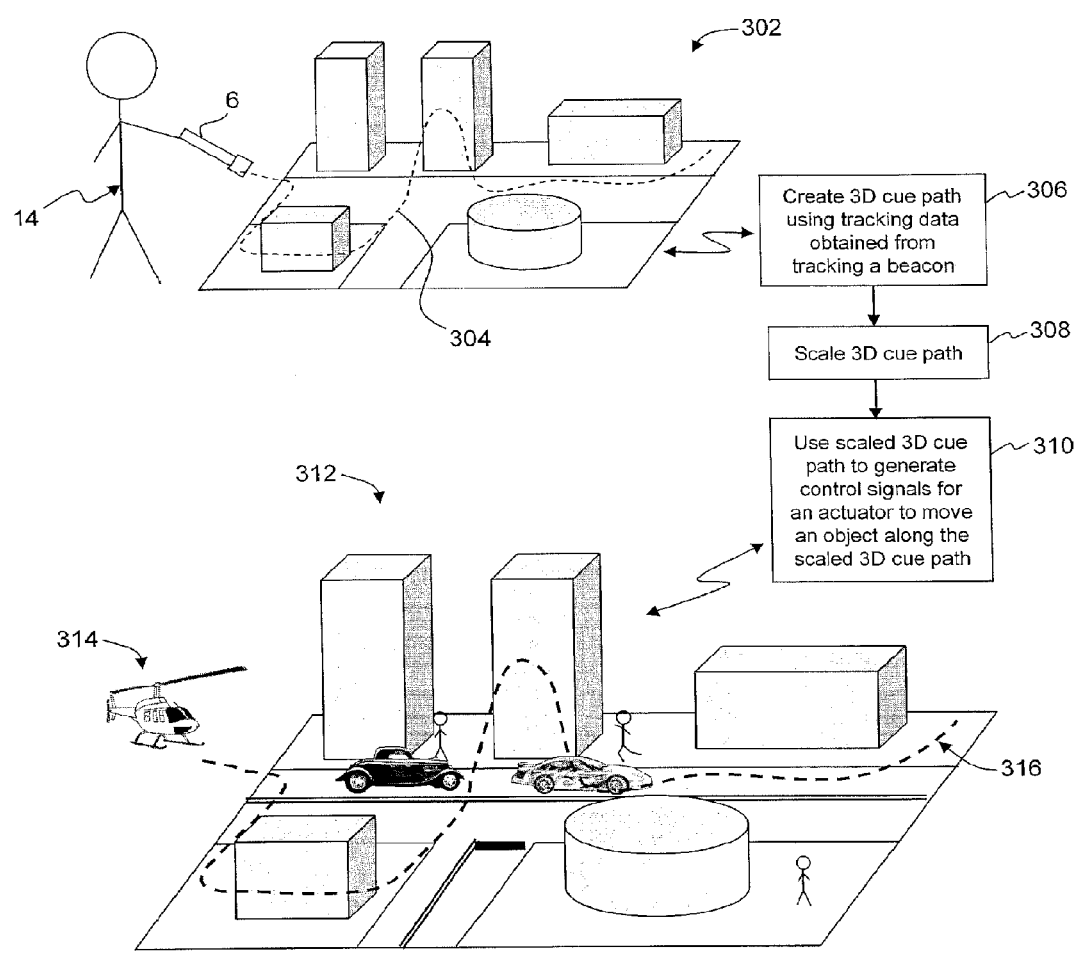
FIG. 16 is a schematic diagram showing a cue path being created in a miniature model and a larger scaled version of the cue path being used in a life-size environment, and FIG. 16 includes a flow diagram illustrating example computer executable or processor implemented instructions for scaling the cue path.

Turning to FIG. 16, a miniature model 302 of a road and some buildings are shown. The miniature model is a scaled-down representation of part of a town or city 312. A user 14 holds a beacon 6 which can be tracked by a tracking system 8. The user 14 moves the beacon 6 through the miniature model 302. The movement and path of the beacon 6, as recorded by the tracking system 8, define a path 304. Referring to block 306, the computing device 50 uses the tracked path 304 as a 3D cue path. It can be appreciated that the dimensions of the 3D cue path are relative to the dimensions of the miniature model 302. At block 308, the 3D cue path is scaled upwards so that its dimensions are suitable for use in the real-world town or city 312. For example, if the scaling factor for the real-world town 312 to the miniature model 302 is a:1, then the scaling factor for the model 3D cue path 304 to the real-world 3D cue path 316 is 1:a. At block 310, the scaled 3D cue path is used to generate control signals for an actuator to move an object along the 3D cue path.

For example, as shown in FIG. 16, the real-world town or city 312 has people and cars. A helicopter 314 (e.g. the object) is equipped with a camera. The helicopter 314 follows the scaled path 316 through the real-world town or city 312 to capture video images using the camera. In this way, a user 14 can easily and intuitively design and create a 3D cue path, such as for the helicopter 314 to shoot a movie of cars chasing each other. It can be appreciated that although the example embodiment is described with respect to capturing movie images, the principles of using a beacon 6 to create a smaller-sized cue path and then scaling the smaller-sized cue path can be used in other applications.

Figure 17:
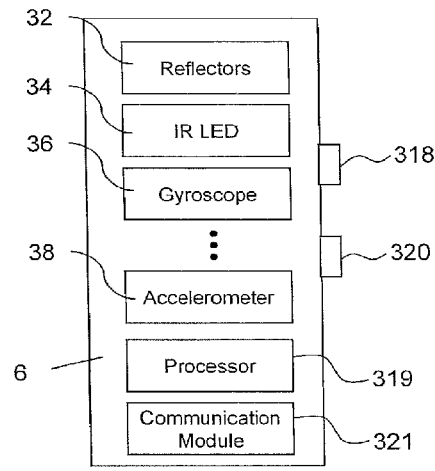
FIG. 17 is a schematic diagram of an example embodiment beacon including a button for marking a flag along the path.

Turning to FIG. 17, an example embodiment of a beacon 6 is shown. It includes reflectors 32 and an IR LED 34, which allow the beacon 6 to be tracked using image recognition. It also includes inertial measurement units, such as a gyroscope 36 and an accelerometer 38. It also includes a processor 319, memory, and a communication module 321 for sending and receiving data. The communication module 321 may use currently known or future known wired or wireless communication technologies. The beacon 6 may also include one or more buttons. For example, there is a button 318 for turning on and turning off the tracking functionality associated with the beacon 6. There is also another button 320 for marking or indicating flag points. For example, when a user presses the flagging button 320, a digital flag or marker is recorded in association with the spatial attributes (e.g. X, Y, Z coordinates and roll, pitch, yaw angles of the beacon) and the temporal attributes (e.g. time stamp, as well as velocity and acceleration of the beacon) at the instant or moment that the button 320 was pressed. A user can mark or indicate multiple digital flags along the path by pressing the button 320 multiple times. In an example embodiment, the flags and the corresponding spatial and temporal attributes can be transmitted from the beacon 6, via the communication module 321, to the tracking system 8 or the computing device 50.

In an example embodiment, the digital flag appears on the line representing the path, when the path is displayed in a 3D virtual environment. The digital flag helps a user to modify the path, or create limitations for the path, after it has been created using the beacon 6.

Figure 18:
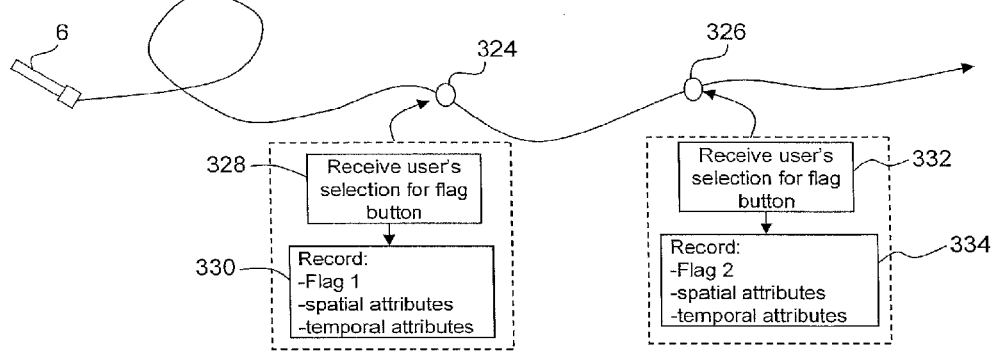
FIG. 18 is a schematic diagram showing an example embodiment of how the beacon of FIG. 17 is being used to create a path and mark flags along the path.

For example, turning to FIG. 18, a beacon 6 is moved in a certain way to create a path 322. In other words, a tracking system 8, not shown, tracks the path 322 of the beacon and records the path 322. As the beacon 6 is being moved, a user presses the button 320 twice, once at location 324 and then once at location 326. With respect to location 324, after the beacon 6 detects that user selection has been received to mark or indicate a digital flag (block 328), then the following information is recorded: a flag ID (e.g. Flag 1), the spatial attributes of the beacon 6 at the location 324, and the temporal attributes of the beacon 6 at the location 324 (block 330).

Similarly, when the user presses the button 320 at location 326, the beacon 6 receives the user's selection to indicate another flag (block 332). This triggers the following information to be recorded: another flag ID (e.g. Flag 2), the spatial attributes of the beacon 6 at the location 326, and the temporal attributes of the beacon 6 at the location 326 (block 334).

It can be appreciated that the spatial attributes and the temporal attributes can be measured using the sensors located within the beacon 6, or can be measured using external sensors of the tracking system 8, or a combination thereof.

Figure 19:
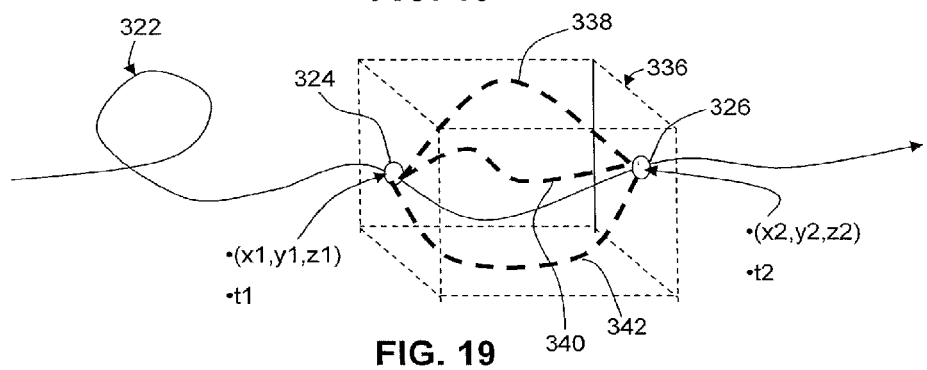
FIG. 19 is a schematic diagram showing an example embodiment of a boundary volume defined by at least two flagged locations along the path shown in FIG. 18.

Turning to FIG. 19, in an example embodiment, the flags at locations 324 and 326 are used to establish a boundary volume within which the path can deviate. For example, when a user was using the beacon 6 to create the path 322, the user marked flags at the locations 324 and 326 to indicate the beginning and end of a segment from which a path can deviate. In other words, when an object follows the path 322, there are rules that guide or control the object to follow the path 322 exactly, or very closely to the path 322. However, along the segment defined by the beginning and end locations 324 and 326, respectively, an object does not need to follow the path exactly or very closely, and can deviate from the path 322. A boundary volume 336 defines the extent to which an object can deviate from the path 322.

Referring to FIG. 19, the example embodiment boundary volume 336 is a rectangular prism which has the location 324 coinciding with one face of the prism and the location 326 coinciding with an opposite face of the prism. It can be appreciated that other shapes of boundary volumes can be used. In the example embodiment, the spatial and temporal attributes associated with Flag 1 at location 324 include the coordinates x1, y1, z1 and the time stamp t1. The spatial and temporal attributes associated with Flag 2 at location 326 include the coordinates x2, y2, z2 and the time stamp t2.

An example embodiment of a rule includes that an object following the path 322 must follow the path 322 up until at least the location 324 (e.g. x1, y1, z1), may deviate from the path 322 within the volume boundary 336, and then must continue following the path 322 from the location 326 (e.g. x2, y2, z2). Examples of deviated paths include dotted lines 338, 340 and 342. These deviated paths begin and end at locations 324 and 326.

In another example embodiment of a rule, an object following the path 322 must follow the path 322 up until the location 324 and arrive at the location 324 at the time t1. The object is then allowed to deviate from the path 322 within the volume boundary 336, and must arrive at the location 326 at the time t2. After arriving at the location 326 at time t2, it then continues to follow the path 322.

It can be appreciated that such example embodiment rules can be implemented by the computing device 50 when generating control signals for an actuator that moves the object along the path 322.

It may be desirable to have a boundary volume 336 that allows the object to move freely within. For example, when creating a theatrical or movie production, the boundary volume 336 coincides with a location of the theatrical scenery where there is uncertainty in the positioning of people and objects. Therefore, a dynamic path planning algorithm may be used to move an object from location 324 to location 326, instead of following the path 322.

Figure 20:
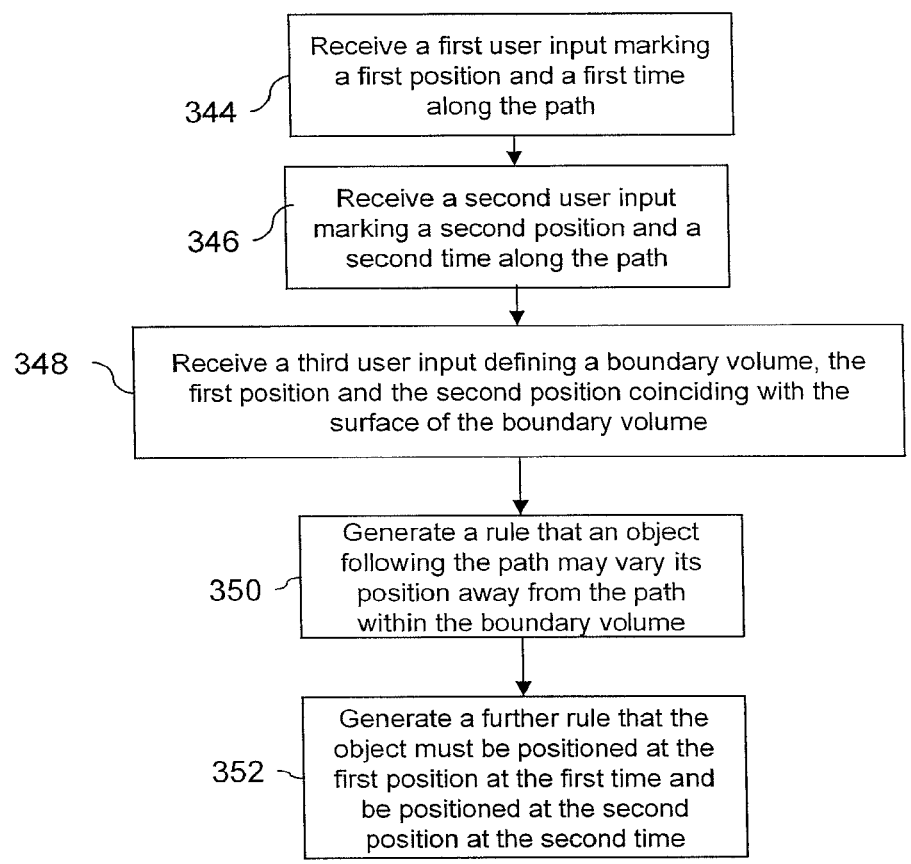
FIG. 20 is a flow diagram illustrating example computer executable or processor implemented instructions for generating a boundary volume around a segment of a path.

Turning to FIG. 20, an example embodiment of computer executable and processor implemented instructions are provided for generating rules for following a path. At block 344, the computing device 50 receives a first user input marking a first position and a first time along the path. At block 346, the computing device 50 receives a second user input marking a second position and second time along the path. In an example embodiment, the first and second user inputs are provided via the beacon 6 using the flagging button 320. In another example embodiment, the first and second user inputs are provided through a GUI 12 when editing or viewing the path in a 3D virtual environment. At block 348, the computing device 50 receives a third user input (e.g. via the GUI 12) defining a boundary volume. The first position and the second position coincide with the surface, or the surfaces, of the boundary volume. At block 350, a rule is generated that an object following the path may vary its position from the path within the boundary volume. At block 352, a further rule is generated that the object must be positioned at the first position at the first indicated time, and be positioned at the second position at the second indicated time.

The above process allows a user to conveniently and intuitively create a boundary volume within which an object is allowed to deviate from the path. Furthermore, the flagging button 326 on the beacon 6 allows a user to define the beginning and end locations of the boundary volume while creating a path using the beacon 6.

Figure 21A:
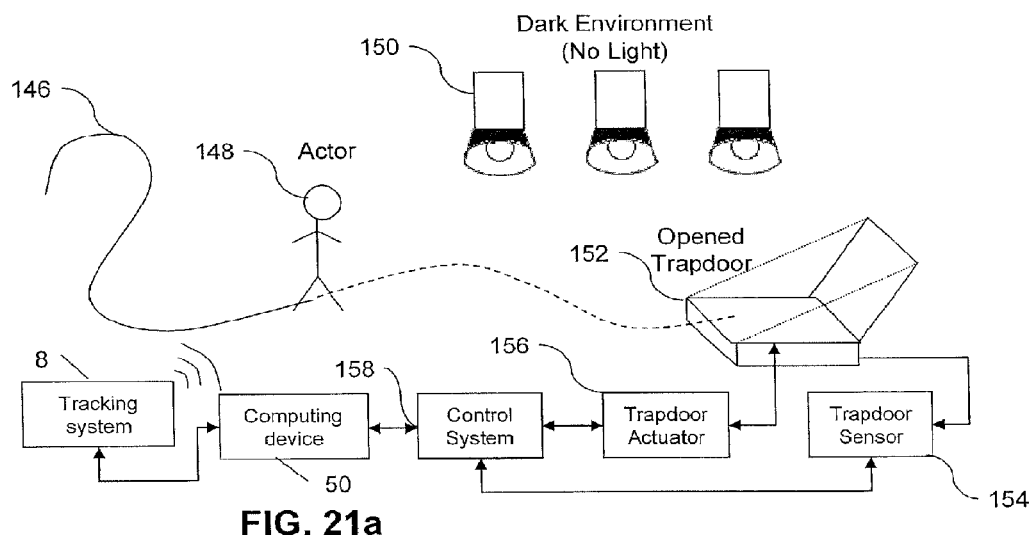
FIG. 21a is an example system for coordinating a path of a person with another object.

Turning now to FIG. 21*a*, an example scenario of a cue path with an environmental constraint is provided. An actor 148 is moving along a cue path 4 and has his position monitored by a tracking system 8. The lighting 150 in the environment is turned off, so the actor is unable to see the floor on which he is walking. The actor's cue path 146 will lead the actor to walk over a trapdoor 152. The trapdoor 152 is in an open position. The actor is unable to see that trapdoor 152 is open because the lighting 150 is turned off. This poses a safety risk to the actor. However, the cue path 146 has an environmental constraint that determines whether or not the trapdoor 152 is open. The open and closed positions of the trap door can be detected using a trapdoor sensor 154.

Figure 21B:
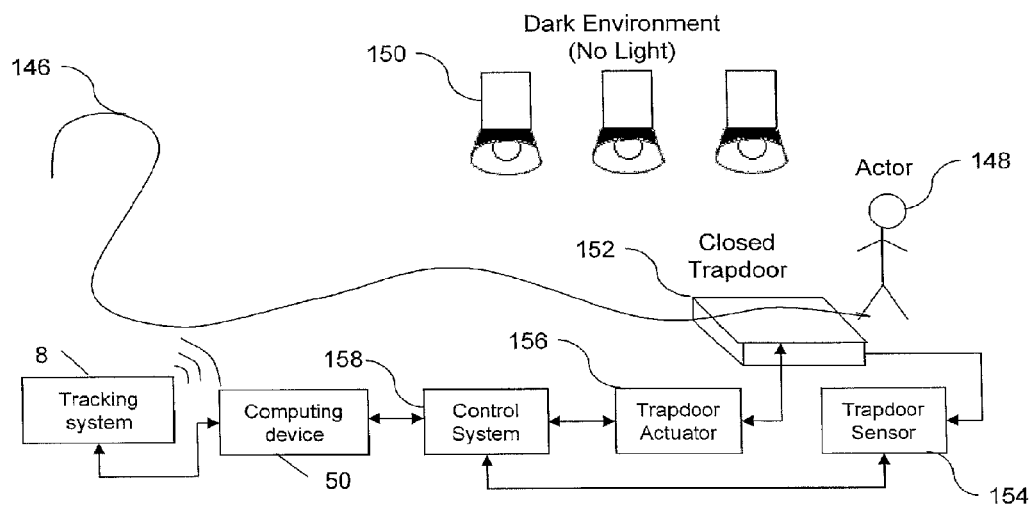
FIG. 21b is the example system of FIG. 21a illustrating the person and the other object in a different state.

Therefore, referring now to FIG. 21*b*, when the tracking system 8 detects that the actor 148 is approaching trapdoor 152, which is detected to be initially open, the computing device 50 will issue a command to a controller 158 to close the trap door using a trap door actuator 156. The actor 148 moves over the closed trapdoor 152. It can be appreciated that the cue path can be used as a predictive measure to determine whether the planned path may cause any issues, such as safety risks. As the object moves along the path, measures can be taken to address the issues. In another example embodiment, the cue path 146 of the actor 148 can be modified to go around the opened trap door 152. In another example embodiment, if the cue path 146 intersects the opened trapdoor 152, the computing device 50 sends a warning to the actor 148 and to a stage director (not shown). The warning may also trigger the light 150 to be turned on to improve the visual safety and awareness of the trapdoor 152.

Figure 22A:
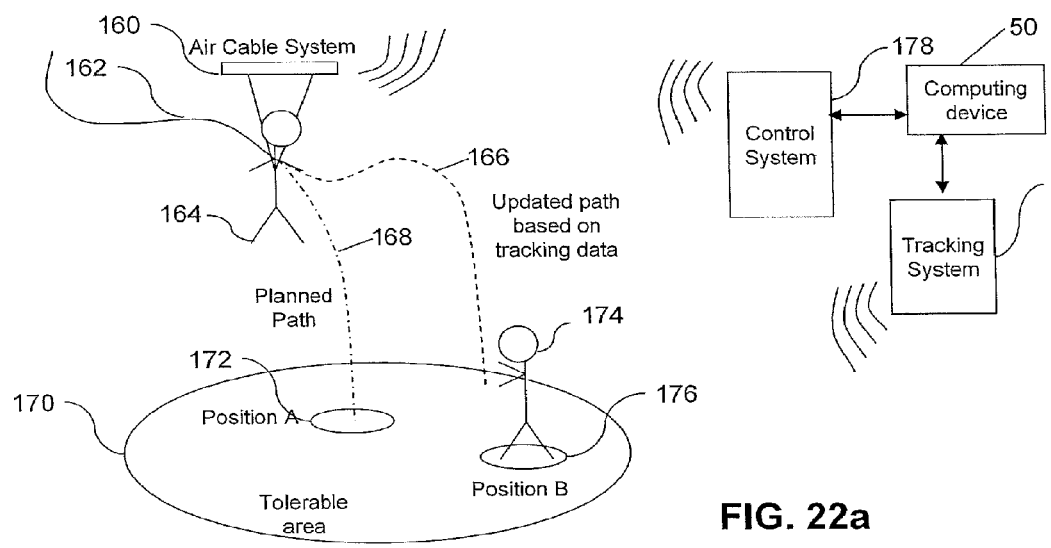
FIG. 22a is an example system for modifying a cue path of a person in relation to another person.

Turning to FIG. 22*a*, an example scenario of a cue path is provided. A first actor 164 is suspended by an air cable system 160. For example, the air cable system 160 can comprise a track and a winch to move an object (e.g. an actor) in a flying motion. The air cable system 160 may also be referred to as a flying harness and it is controlled by a controller 178. The controller 178 can be considered as equipment 40 and it is in communication with a computing device 50. The position and motion of the first actor 164 and a second actor 174 can be monitored by the tracking system 8.

The computing device 50 may have stored thereon a cue path 162, 168, and the controller 178 is configured to move the first actor 164 along the cue path 162, 168 using the air cable system 160. The originally planned end point of the planned cue path 162, 168 is position A 172. It is originally planned that the second actor 174 will catch the first actor 164 at position A 172. The current position of the second actor 174 is identified as position B 176.

The computing device 50 may also have stored in association with the planned cue path certain tolerances. For example, the planned cue path's end point can be updated dynamically based on certain conditions and circumstances as long as the end point is located within a given area 170, also referred to as the tolerable area. For example, if the second actor 174 is not properly positioned at the planned end point (e.g. position A 172), then the end segment of the planned cue path can be updated so that the position of the end point coincides with the position of the second actor (e.g. position B 176). At least a portion of the cue path 166 can be updated so that the cue path's end point coincides with position B 176.

Figure 22B:
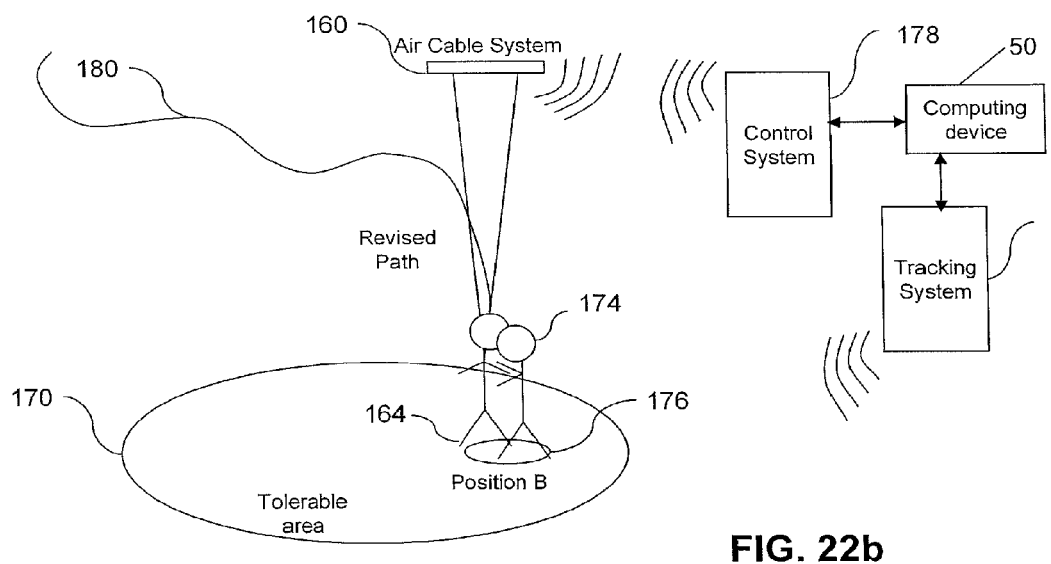
FIG. 22b is the example system of FIG. 22a illustrating the person and other person in a different state according to the modified cue path.

Continuing with FIG. 22*a*, the second actor 174 is waiting to catch the first actor 164 at position B 176. The air cable system 90 is capable of moving the first actor 164 in three dimensions along the cue path 162, 168, 166. The positions of the first actor 164 and the second actor 174 are monitored by the tracking system 8. The cue path is constrained such that the first actor 164 is to be placed on the ground within the tolerable area 170. The cue path is further constrained such that the first actor 164 must be placed at the location of the second actor 174 so that the second actor 174 can catch the first actor 164. The planned cue path 161, 168 would have the second actor waiting for the first actor at position A 172. However, as shown in FIG. 22*a*, the second actor 174 is waiting at position B 176, which is within the tolerable area 170. The tracking system 8 detects that the second actor 174 is at position B 176, and will therefore not be able to catch the first actor 164 if the originally planned cue path 162, 168 is followed. The system therefore generates an adjusted cue path 162, 166 such that the first actor 164 will be placed at position B 176. As shown in FIG. 22*b*, the air cable system 160 moves the first actor 164 along the revised or adjusted path 180 such that the second actor 176 is able to catch him at position B 176.

This example shows how the proposed systems and methods described herein can be used to adjust cue paths depending on predetermined conditions and parameters. The example of FIGS. 22*a* and 22*b* show that actors or objects following cue paths can be protected. For example, had the system not adjusted the path of the first actor 164, the second actor 174 may not have been able to catch the first actor 164, which might result in the first actor 164 being hurt from the fall.

Turning to FIG. 23, a similar example scenario is shown in which a first actor 164 is suspended by an air cable system 160. A control algorithm, which depends on the position and time of the second actor 174, is provided for controlling the movement of the first actor 164 along the cue path 168. In particular, after the computing device 50 detects that the second actor 174 has moved into the zone 354 within a specified time period, the computing device 50 sends control signals to the control system 178 to move the actor 164 along the cue path 168. Such an example control algorithm can be used to improve the automation and timing of using a cue path, as well as responsiveness to actions that are more difficult to predict. For example, it is difficult to predict the timing of the second actor 174 entering the zone 354.

Turning to FIG. 24, an example embodiment of computer executable or processor implemented instructions are provided for triggering the use of a cue path. At block 356, the computing device 50 determines whether or not a user or an object is within a zone or an area within a specified time period. If so, after the object is detected within the zone and within the specified time period, the cue path is automatically used. Either the same user or the same object follows the cue path, or another user or another object follows the cue path.

However, if the user or the object is not detected within the zone within the specified time period, then at block 360, the cue path is not automatically used. For example, after the specified time period has expired or ended, the computing device 50 displays on a GUI a control to manually trigger the user of the cue path (block 362). In another example embodiment, after the specified time period has expired, the computing device 50 continues to monitor the user of the object. After determining that the user or the object has entered the zone, then the computing device 50 displays on a GUI a control to manually trigger the use of the cue path (block 364).

As shown in FIG. 25, an example embodiment of a GUI 366 is shown with controls 368, 370 to manually activate the use of the cue path. For example, if a user selection the "Yes" button 368, the computing device 50 then activates the cue path. If a selection of the "No" button 370 is received, then the cue path is not activated. Although not shown, in an example embodiment of the GUI 366, the GUI 366 includes a message indicating that the desired conditions have not been met and, therefore, the automatic activation of using the cue path has been cancelled. This provides more information to the user when making a decision of whether or not to manually activate the use of the cue path.

The process described with respect to FIG. 24 allows the use of a cue path to be automatically activated under the desired conditions. However, if the desired conditions are not met, controls and prompts are provided for the user to manually activate the use of the cue path.

Figure 26A:
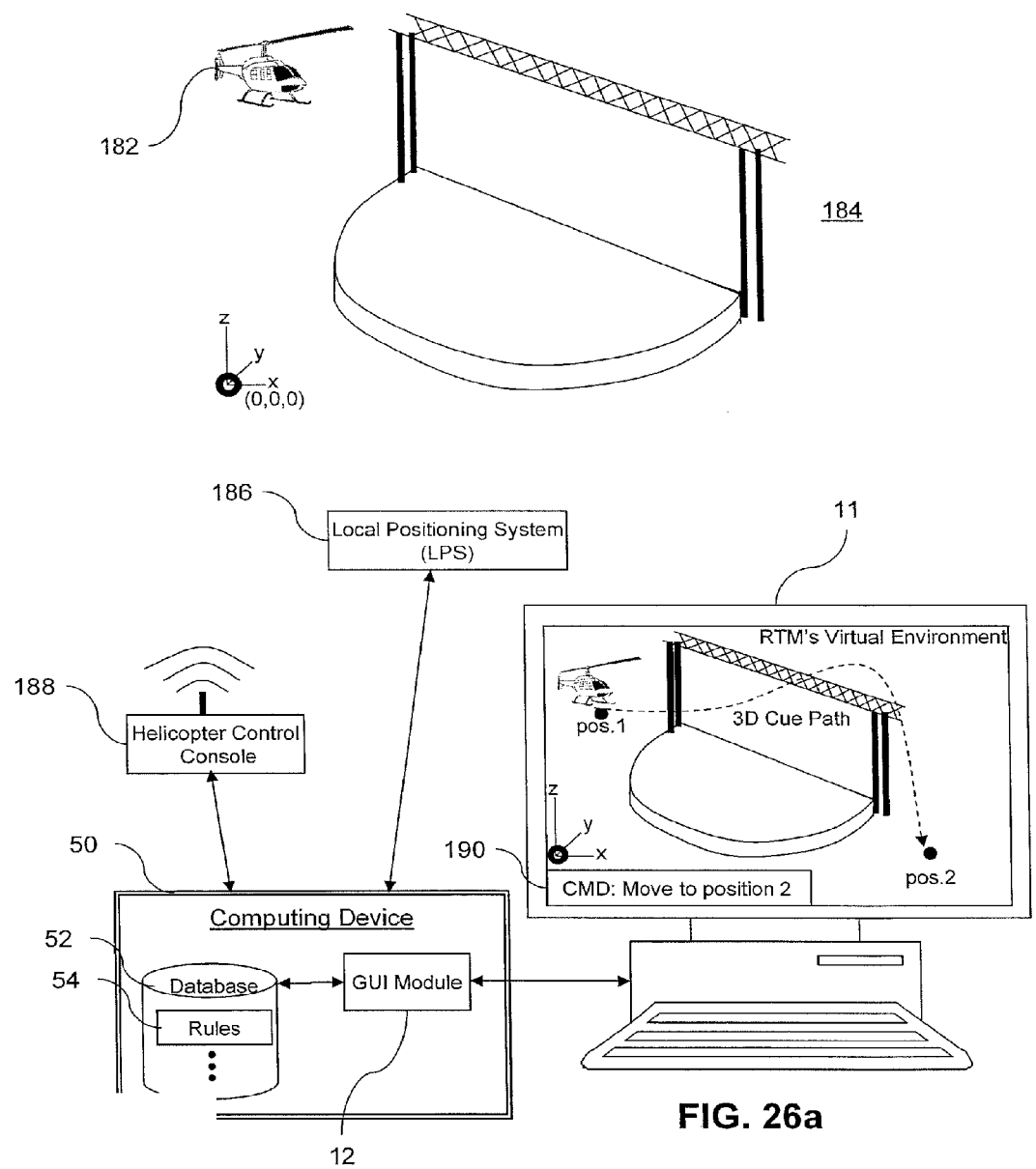
FIG. 26a is an example system where an object is tracked as it follows a cue path in accordance with the present invention.
Figure 26B:
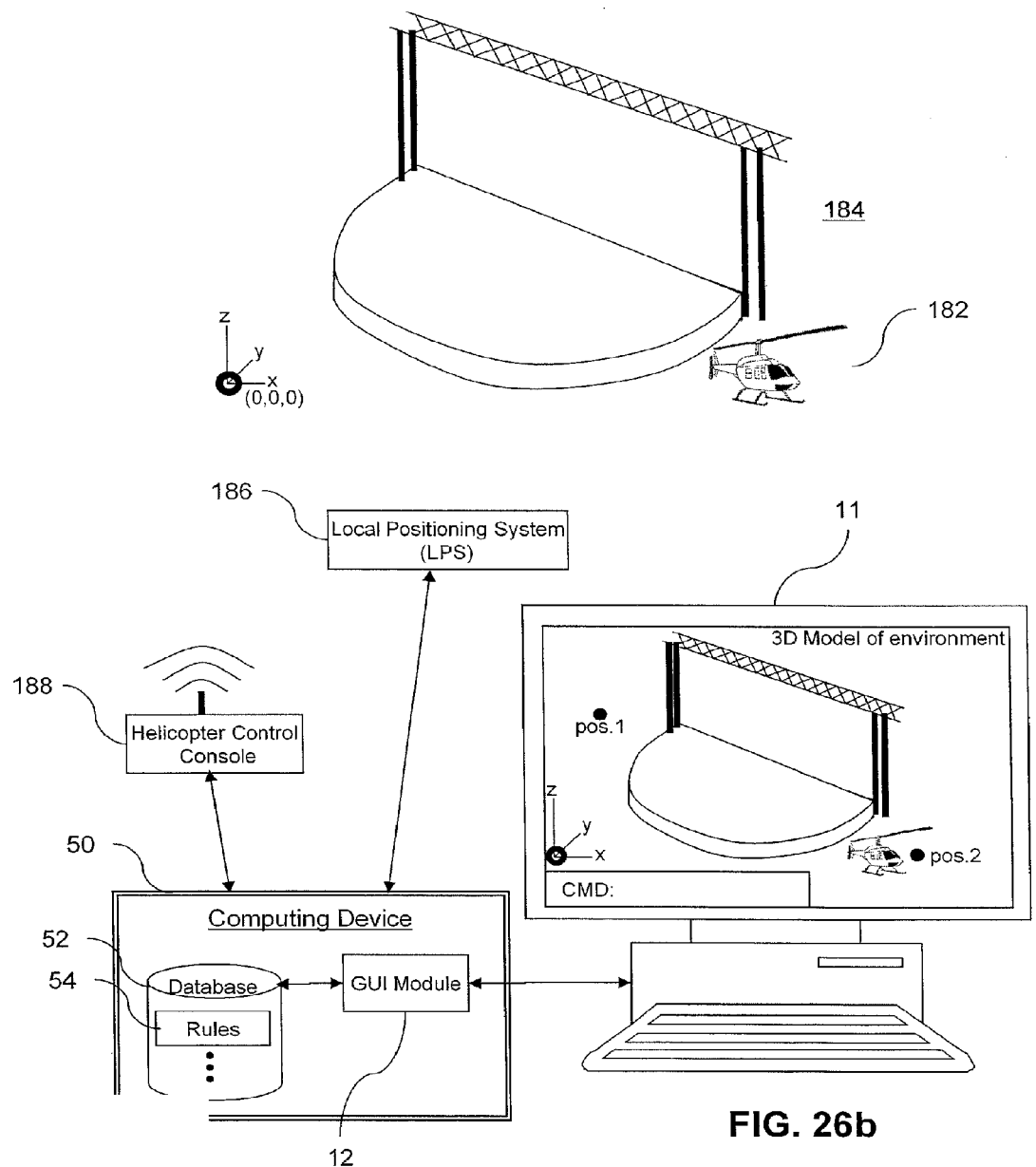
FIG. 26b is the example system of FIG. 26a where the object is in a different state.

Turning now to FIGS. 26a and 26b, an example configuration for enacting a cue path is provided. As shown in FIG. 26a, a helicopter 182 (e.g. a remote controlled helicopter) in a physical environment 184 is given a command 190 to move from "position 1" to "position 2" along a 3D cue path, as shown on display 11. This command is input via GUI 12, which stores the data in database 52 on the computing device 50. The computing device 50 issues the command to helicopter control console 188, which directs the helicopter 182 along its cue path. Local positioning system (LPS) 186 tracks the helicopter 182 as it moves through the physical environment 184. The position of helicopter 182, as recorded by the LPS 186, is displayed on the display 11. As shown in FIG. 26b, the helicopter control console 100 issues commands to move the helicopter 182 to position 2, according to the cue path, and the helicopter's new position in the physical environment 184 is reflected in the display 11.

Figure 27:
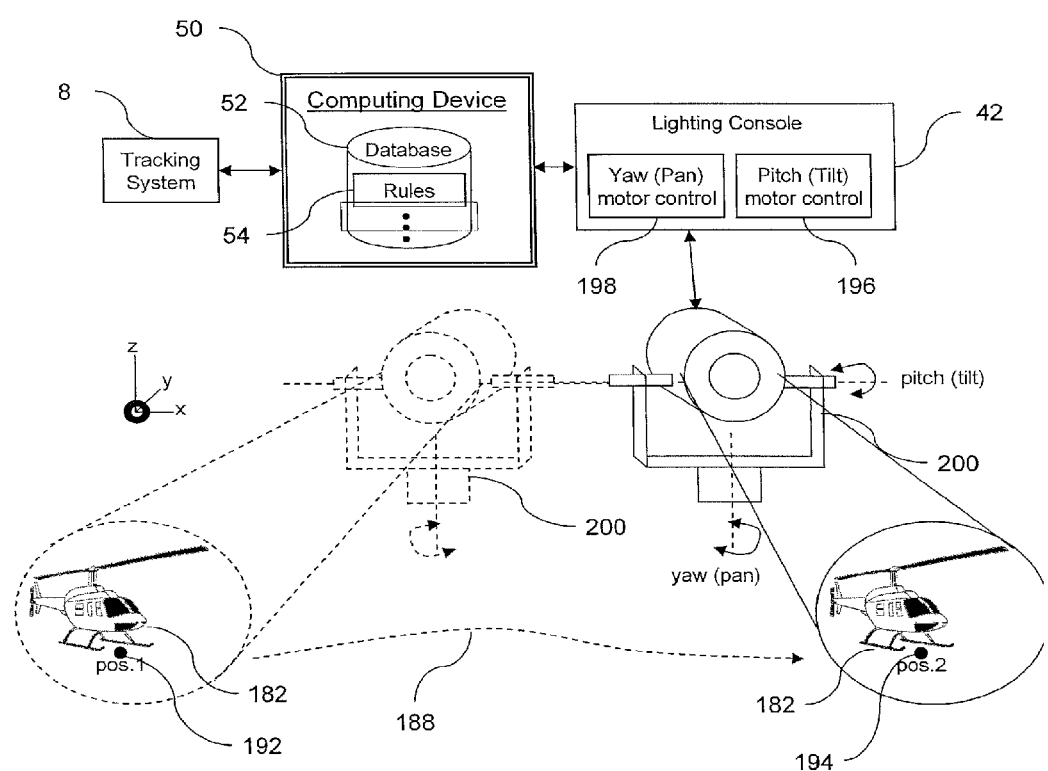
FIG. 27 is an example system where a spotlight is coordinated to follow an object as it moves along its cue path.

Turning now to FIG. 27, an example scenario of a stage element's cue path being constrained to follow the cue path of another stage element is provided. A helicopter 182 is instructed to move along a cue path 188 from "position 1" 192 to "position 2" 194. A light fixture 200 (e.g. a robotic light fixture) is also constrained to follow the same cue path 188 such that, as its spotlight moves according to the cue path 188, the spotlight is pointed at the helicopter 182. The light fixture 200 may pan or tilt, or both, to change its orientation. A tracking system 8 may also track the location of the helicopter 182 and provides the collected data to database 52 of the computing device 50. A lighting console 42 is in communication with the computing device 50. The lighting console 42 generates pan controls in yaw motor control 198 and tilt controls in pitch motor control 196. These controls orient the light fixture 200 such that it fulfills its constraint to shine its spotlight on helicopter 182, as shown by the change in position of the spotlight from position 192 to 194.

There may be rules 54 for determining the behaviour of the light fixture 200 should the helicopter 182 deviate from the cue path 188. For example, the light fixture 200 may be commanded to shine a spot light to follow a cue path 188, as long as the helicopter 182 is following the cue path (e.g. in terms of position and timing) within certain conditions and tolerances. If the helicopter 182 deviates from the cue path 188 beyond the certain conditions and tolerances, then the cue path of the lighting fixture 200 is revised to follow the helicopter's position as determined by the tracking system 8.

It can be appreciated that the above examples embodiments show different approaches of an object or person following a cue path. In some example embodiments, the cue path can be modified or adjusted based on given conditions and rules.

In another example embodiment, the process of generating and using cue paths in a predictable and repetitive manner allows tests to be repeated in a predictable and repetitive manner. In a general example embodiment, a 3D cue path is created; an object, thing, or a person moves along the cue path; test or experimental data is gathered as the cue path is being used; the cue path is modified in a controlled manner (e.g. the spatial or temporal attributes are changed in an incremental manner); the object, thing, or the person moves along the modified cue path; and additional test or experimental data is gathered as the modified cue path is being used.

For example, a cue path for a stream of wind can be created. The cue path for example, can control or specify the direction of the wind, the positioning of the wind source, and the speed of the wind stream. The stream of wind can be used in a wind tunnel to test the aerodynamic performance of a car. The stream of wind is activated using a first cue path and the aerodynamic test data is recorded. In another test, the stream of wind is activated using a second cue path and another set of aerodynamic data is recorded. The process can be repeated many times using different cue paths.

In another example, a cue path for the positioning of sound can be created. In other words, the cue path is used to mark the spatial and temporal attributes of how the sound moves throughout a space. The sound, for example, can be made to move in three-dimensional space using a surround sound system, using currently known or future known sound technologies. In another example embodiment, a sound source, such as an audio speaker, can be positioned on an actuator and moved around in physical space. A sound system and cue path system can be used to test how sound travels (e.g. transmits and reflects) in the physical space (e.g. an auditorium, a stadium, a car, a recording studio, etc.) from various positions. A test involves the sound moving according to a cue path, and recording the properties of the sound in various locations of the physical space. It can be appreciated that as the sound moves, the transmission and reflection properties can change. The use of the cue path can help automate the sound testing process by positioning the sound source in a predictable, controlled, and measured manner. In other words, the position of the sound source and the recorded sound data can be associated with each other to determine if there are possible relationships.

It can therefore be appreciated that cue paths can be used to assist in gathering test data in an automated fashion that is predictable, controlled, and measured. The cue paths also allow tests to be accurately repeated.

In another example embodiment, a cue path is used to control the movement of a golf cart that can be automatically controlled. A golf cart is commanded to follow a cue path. As the golf cart moves along the cue path, certain events are triggered at certain locations. For example, explanations of the environment are triggered at certain locations. This can be used to provide an automated audio tour guide as a golf cart moves through a space. The golf cart can also be commanded to stop at certain locations and unlock the doors to allow passengers to board or exit the golf cart.

In another example embodiment, a cue path can be used to control the movement of a robotic camera. It can also be used to control the lens focus, or image focus, of the robotic camera. For example, a robotic camera captures images an object that moves along a cue path, and based on the cue path, the position and orientation of the camera, as well as the focusing parameters of the camera are automatically adjusted.

In general, as an object follows a cue path, various actions can be triggered as the object arrives at certain locations on the cue path.

In general, an example method is provided for generating a cue path, the method comprising: tracking and recording three-dimensional position and timing of a beacon moving in space to generate the cue path; receiving an input to manipulate at least one of the position and the timing of the cue path; and generating commands for an object to follow the manipulated cue path.

In another example aspect, the method further comprises displaying a graphical user interface to receive the input to manipulate the cue path. In another example aspect, instructions for the object are associated with one or more certain segments of the manipulated cue path. In another example aspect, the cue path is manipulated by scaling the dimensions of the cue path. In another example aspect, the cue path is manipulated by extending at least a portion of the cue path. In another example aspect, another cue path is added to the cue path. In another example aspect, the cue path is manipulated by changing at least one of the speed and the acceleration of which the object is to move along a given segment of the cue path. In another example aspect, the method further comprises receiving instructions to perform if certain parameters associated with the manipulated cue path are not satisfied. In another example aspect, the beacon comprises at least one infrared LED, a gyroscope and an accelerometer.

In general, an example method is provided for modifying a cue path, the method comprising: obtaining the cue path, the cue path comprising three-dimensional position data and associated timing data; generating one or more commands for an object to follow the cue path; tracking at least the movement of the object; determining if one or more rules have been breached, the one or more rules associated with the cue path; and, if so, at least one of generating a command to modifying an aspect the cue path's environment according to the one or more rules, and modifying the cue path according to the one or more rules.

In another example aspect, if the cue path is modified according to the one or more rules, generating one or more new commands for the object to follow the modified cue path. In another example aspect, the cue path is obtained by tracking and recording three-dimensional position and timing of a beacon moving in space to generate the cue path. In another example aspect, the one or more rules have been breached if an obstacle in the cue path is detected. In another example aspect, the command to modify the aspect of the cue path's environment allows the object to continue following the cue path. In another example aspect, the method further comprises tracking a position of an other object, and the one or more rules have been breached if the position of the other object does not coincide with an originally planned endpoint of the cue path. In another example aspect, the cue path is modified to generate a new endpoint coinciding with the position of the other object.

The steps or operations in the flow charts described herein are just for examples. There may be many variations to these steps or operations without departing from the spirit of the invention. For instance, the steps may be performed in a differing order, or steps may be added, deleted, or modified.

The principles described herein may be used for applications other than planning a theatrical event. For example, a military operation may be planned by assigning soldiers, vehicles, and drones paths to follow within certain constraints, monitoring their progress along those paths, and responding accordingly if the constraints are violated. Other example applications may include air traffic control systems, supply management systems, and warehouse systems. The principles described herein may also apply to situations where a designer plans or designs movements and/or actions in a physical space.

Although the above has been described with reference to certain specific embodiments, various modifications thereof will be apparent to those skilled in the art as outlined in the appended claims.

The invention claimed is:

1. A method for generating a cue path, the method comprising:
   tracking and recording a three-dimensional physical path of a beacon moving in a physical space, the physical path comprising three-dimensional position of the movement of the beacon;
   while tracking and recording the physical path of the beacon, receiving a first user input and a second user input via a button on the beacon at separate times and positions along the physical path to generate digital flags;
   generating a digital cue path that corresponds to the physical path of the beacon, the digital cue path including a first digital flag corresponding to a three-dimensional position at which the first user input was received and a second digital flag corresponding to a three-dimensional position at which the second user input was received;
   defining an uncertainty portion of the digital cue path bound by at least the first digital flag and the second digital flag; and
   generating predefined commands for a physical object to move according to the digital cue path up until the physical object reaches the first digital flag and, for the uncertainty portion,
   generating commands using a dynamic path planning algorithm to move the physical object until it reaches the second digital flag, wherein the movement of the physical object deviates from the digital cue path during the uncertainty portion.

2. The method of claim 1 further comprising displaying a graphical user interface to receive an input to manipulate the digital cue path.

3. The method of claim 1 further comprising displaying a graphical user interface to receive an input to define a boundary volume within which the movement of the physical object can move within, the boundary volume defined at least by the first digital flag and the second digital flag.

4. The method of claim 2 wherein the digital cue path is manipulated by scaling the dimensions of the digital cue path.

5. The method of claim 2 wherein the digital cue path is manipulated by extending at least a portion of the digital cue path.

6. The method of claim 5 wherein another digital cue path segment is added to the digital cue path to form the manipulated digital cue path.

7. The method of claim 2 wherein the digital cue path is manipulated by changing at least one of the speed and the acceleration of which the object is to move along a given segment of the digital cue path.

8. The method of claim 1 wherein the beacon comprises at least one infrared LED, a gyroscope and an accelerometer.

9. A method for modifying a cue path, the method comprising:
   obtaining the cue path, the cue path comprising three-dimensional position data and associated timing data;
   generating one or more commands for an object to follow the cue path;
   tracking at least the movement of the object and tracking a position of another object;

determining if one or more rules have been breached, wherein the one or more rules have been breached if the position of the other object does not coincide with an originally planned endpoint of the cue path; and if so, at least one of generating a command to modifying an aspect the cue path's environment according to the one or more rules, and modifying the cue path according to the one or more rules.

10. The method of claim 9 wherein, if the cue path is modified according to the one or more rules, generating one or more new commands for the object to follow the modified cue path.

11. The method of claim 9 wherein the cue path is obtained by tracking and recording three-dimensional position and timing of a beacon moving in space to generate the cue path.

12. The method of claim 9 wherein the one or more rules have also been breached if an obstacle in the cue path is detected.

13. The method of claim 9 wherein the command to modify the aspect of the cue path's environment allows the object to continue following the cue path.

14. The method of claim 9 wherein the cue path is modified to generate a new endpoint coinciding with the position of the other object.

15. A system for generating a cue path, the system comprising:
a tracking system for tracking and recording a three-dimensional physical path of a beacon moving in a physical space, the physical path comprising three-dimensional position of the movement of the beacon, and the tracking system configured to receive a first user input and a second user input via a button on the beacon at separate times and positions along the physical path to generate digital flags while tracking the beacon;
a computing system in communication with the tracking system, the computing system for generating a digital cue path that corresponds to the physical path of the beacon, the digital cue path including a first digital flag corresponding to a three-dimensional position at which the first user input was received and a second digital flag corresponding to a three-dimensional position at which the second user input was received;
the computing system configured to define an uncertainty portion of the digital cue path bound by at least the first digital flag and the second digital flag; and
the computing system further configured to generate predefined commands for a physical object to move according to the digital cue path up until the physical object reaches the first digital flag and, for the uncertainty portion, to generate commands using a dynamic path planning algorithm to move the physical object until it reaches the second digital flag, wherein the movement of the physical object deviates from the digital cue path during the uncertainty portion.

16. A computing system for modifying a cue path, the computing system comprising:
memory that stores a cue path;
a processor for obtaining the cue path from the memory, the cue path comprising three-dimensional position data and associated timing data;
the processor further configured for generating one or more commands for an object to follow the cue path;
a communication device for obtaining tracking data for tracking at least the movement of the object and tracking a position of another object;
the processor further configured for determining if one or more rules have been breached, wherein the one or more rules have been breached if the position of the other object does not coincide with an originally planned endpoint of the cue path; and
if so, the processor further configured for at least one of generating a command to modify an aspect the cue path's environment according to the one or more rules, and generating a command to modify the cue path according to the one or more rules.

17. The system of claim 15 wherein the computing system is configured to generate a graphical user interface to receive an input to manipulate the digital cue path.

18. The system of claim 15 wherein the computing system is configured to generate a graphical user interface to receive an input to define a boundary volume within which the movement of the physical object can move within, the boundary volume defined at least by the first digital flag and the second digital flag.

19. The system of claim 17 wherein the digital cue path is manipulated by scaling the dimensions of the digital cue path.

20. The system of claim 17 wherein the digital cue path is manipulated by extending at least a portion of the digital cue path.

21. The system of claim 20 wherein another digital cue path segment is added to the digital cue path to form the manipulated digital cue path.

22. The system of claim 17 wherein the digital cue path is manipulated by changing at least one of the speed and the acceleration of which the object is to move along a given segment of the digital cue path.

23. The system of claim 15 wherein the beacon comprises at least one infrared LED, a gyroscope and an accelerometer.

24. The computing system of claim 16 wherein, if the cue path is modified according to the one or more rules, the processor further configured for generating one or more new commands for the object to follow the modified cue path.

25. The computing system of claim 16 wherein the cue path is obtained by tracking and recording three-dimensional position and timing of a beacon moving in space to generate the cue path.

26. The computing system of claim 16 wherein the one or more rules have also been breached if an obstacle in the cue path is detected.

27. The computing system of claim 16 wherein the command to modify the aspect of the cue path's environment allows the object to continue following the cue path.

28. The computing system of claim 16 wherein the cue path is modified to generate a new endpoint coinciding with the position of the other object.

* * * * *